United States Patent [19]
Kuramochi et al.

[11] Patent Number: 5,737,113
[45] Date of Patent: Apr. 7, 1998

[54] OPTICAL MODULATORS AND COLOR IMAGE DISPLAY DEVICE EMPLOYING THE SAME

[75] Inventors: Junko Kuramochi, Yokohama; Michitaka Setani, Kawasaki; Takehiko Nakai, Kawasaki; Saburo Sugawara, Kawasaki, all of Japan

[73] Assignee: Canon Kabushiki Kaisha, Tokyo, Japan

[21] Appl. No.: 690,870

[22] Filed: Aug. 1, 1996

[30] Foreign Application Priority Data

| Aug. 4, 1995 | [JP] | Japan | 7-199513 |
| Aug. 4, 1995 | [JP] | Japan | 7-199514 |
| Aug. 4, 1995 | [JP] | Japan | 7-199666 |
| Aug. 4, 1995 | [JP] | Japan | 7-199667 |
| Oct. 12, 1995 | [JP] | Japan | 7-264229 |

[51] Int. Cl.$^6$ .................................................. G02F 1/03
[52] U.S. Cl. .................. 359/259; 359/281; 359/247; 359/263; 359/302
[58] Field of Search .................... 359/259, 281, 359/247, 263, 302

[56] References Cited

U.S. PATENT DOCUMENTS

| 3,947,189 | 3/1976 | Huignard | 359/259 |
| 4,900,135 | 2/1990 | Yuasa et al. | 350/354 |

OTHER PUBLICATIONS

Dammann, "Color separation gratings", Applied Optics, vol. 17, No. 15, pp. 2273–2279 (Aug. 1978).

Primary Examiner—Frank G. Font
Assistant Examiner—Reginald A. Ratliff
Attorney, Agent, or Firm—Fitzpatrick, Cella, Harper & Scinto

[57] ABSTRACT

An optical modulator includes a first diffraction grating for separating a light flux of a wide wavelength band into light fluxes of given wavelength bands. The optical modulator further includes an optical modulation element for modulating the separated light fluxes through corresponding picture elements, respectively, and outputting them. The optical modulator further includes a second diffraction grating for synthesizing the modulated light fluxes outputted from the optical modulation element, wherein the first diffraction grating, the optical modulation element and the second diffraction grating are integrally structured.

56 Claims, 36 Drawing Sheets

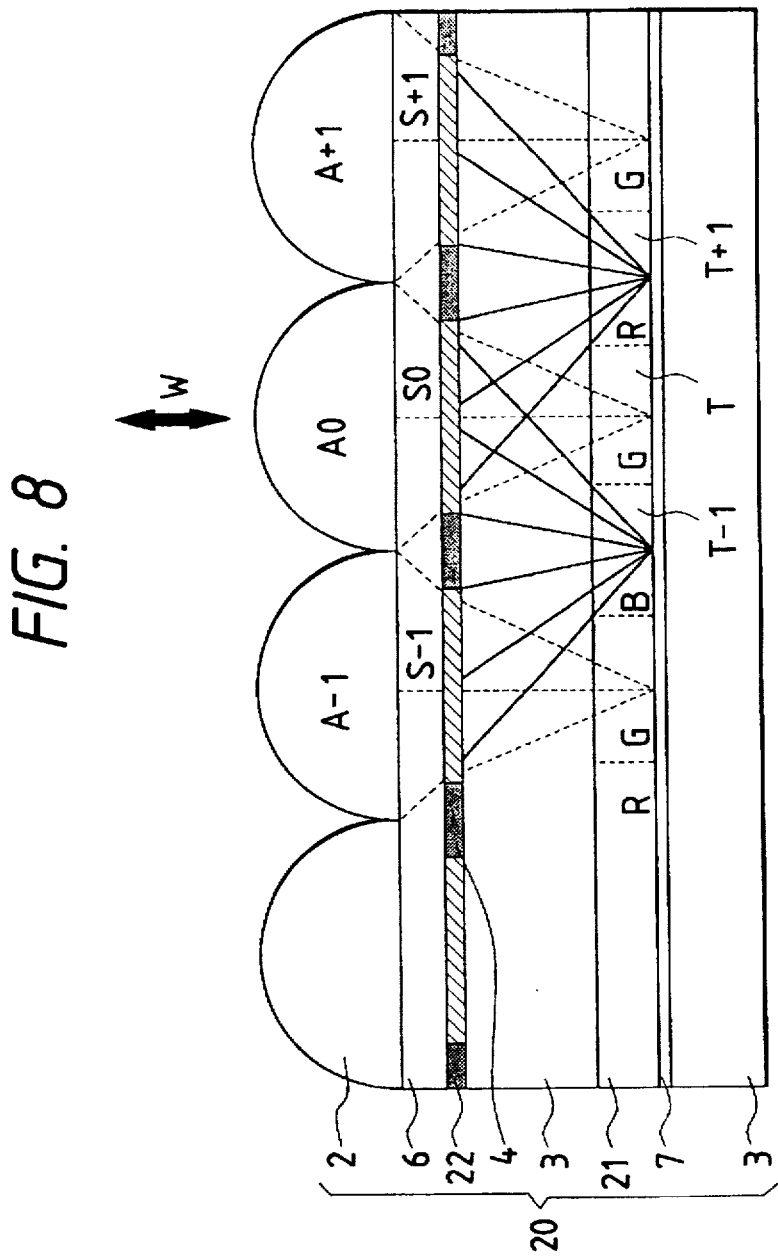

OPTICAL MODULATORS AND COLOR IMAGE DISPLAY DEVICE EMPLOYING THE SAME

BACKGROUND OF THE INVENTION

1. Field of the Invention

The present invention relates to an optical modulator and a color image display device employing such an optical modulator.

2. Related Background Art

Conventionally, in a single-plate color optical modulator using liquid-crystal optical modulation elements, a black matrix for shading wiring of an optical modulation controlled section located around the liquid-crystal optical modulation element occupies the liquid-crystal optical modulation element at the high rate in area. This has been the primary factor to lower the light utilization efficiency of the modulator.

In order to solve this problem, a method has been known as shown in FIG. 1, wherein a microlens array 2 is arranged in front of color filters 51R, 51G and 51B, and light from a white light source is condensed to picture elements of optical modulation elements 201 so as to improve the light utilization efficiency of an optical modulator 200. In FIG. 1, numeral 3 denotes a transparent substrate and numeral 5 black matrixes.

In the foregoing conventional optical modulator, the color filters are used for extracting color lights from the white light depending on the respective optical modulation elements. However, since the color filter transmits only such light having a certain wavelength component in the white light incident upon the picture elements, the light having the other wavelength components in the white light is wasted so that the light utilization efficiency is very low.

Further, when projecting an image in an enlarged fashion or observing a screen near by, there has been a problem that the respective picture elements of R, G and B are seen in a mosaic pattern.

SUMMARY OF THE INVENTION

It is an object of the present invention to achieve a single-plate color optical modulator with less light energy loss and further provide a small-sized optical modulator with excellent image quality.

According to the first aspect of the present invention, an optical modulator comprises a first diffraction grating for separating a light flux of a wide wavelength band into light fluxes of given wavelength bands; an optical modulation element for modulating the separated light fluxes through corresponding picture elements, respectively, and outputting them; and a second diffraction grating for synthesizing the modulated light fluxes outputted from the optical modulation element, wherein the first diffraction grating, the optical modulation element and the second diffraction grating are integrally structured.

It may be arranged in the first aspect of the present invention that the first and second diffraction gratings comprise binary optical elements, respectively.

It may be arranged in the first aspect of the present invention that means is provided for causing a main beam of each of the light fluxes separated by the first diffraction grating to be incident perpendicularly upon corresponding one of the picture elements.

It may be arranged in the first aspect of the present invention that condenser means is provided for converging the light flux of the wide wavelength band and causing the converged light flux to be incident upon each of the picture elements.

It may be arranged in the first aspect of the present invention that condenser means is provided for converging the light fluxes separated by the first diffraction grating and causing the converged light fluxes to be incident upon the picture elements, respectively.

It may be arranged in the first aspect of the present invention that the optical modulation element comprises a liquid-crystal element.

It may be arranged in the first aspect of the present invention that the optical modulator is one of a transmission-type optical modulator and a reflection-type optical modulator.

It may be arranged in the first aspect of the present invention that the optical modulator is the reflection-type optical modulator, and that the first and second diffraction gratings are the same.

According to the second aspect of the present invention, an optical modulator comprises a diffraction grating for separating a light flux of a wide wavelength band into light fluxes of given wavelength bands; an optical modulation element for modulating the separated light fluxes through corresponding picture elements, respectively, and outputting them; and means for causing a main beam of each of the light fluxes separated by the diffraction grating to be incident perpendicularly upon corresponding one of the picture elements.

It may be arranged in the second aspect of the present invention that the diffraction grating comprises a binary optical element.

It may be arranged in the second aspect of the present invention that condenser means is provided for converging the light flux of the wide wavelength band and causing the converged light flux to be incident upon each of the picture elements.

It may be arranged in the second aspect of the present invention that condenser means is provided for converging the light fluxes separated by the diffraction grating and causing the converged light fluxes to be incident upon the picture elements, respectively.

It may be arranged in the second aspect of the present invention that optical synthesizing means is provided for synthesizing the modulated light fluxes outputted from the optical modulation element.

It may be arranged in the second aspect of the present invention that the optical synthesizing means comprises a binary optical element.

It may be arranged in the second aspect of the present invention that the optical modulation element comprises a liquid-crystal element.

It may be arranged in the second aspect of the present invention that the optical modulator is one of a transmission-type optical modulator and a reflection-type optical modulator.

According to the third aspect of the present invention, an optical modulator comprises a binary optical element for separating a light flux of a wide wavelength band into light fluxes of given wavelength bands; and an optical modulation element for modulating the separated light fluxes through corresponding picture elements, respectively, and outputting them.

It may be arranged in the third aspect of the present invention that means is provided for causing a main beam of each of the light fluxes separated by the binary optical element to be incident perpendicularly upon corresponding one of the picture elements.

It may be arranged in the third aspect of the present invention that condenser means is provided for converging the light flux of the wide wavelength band and causing the converged light flux to be incident upon each of the picture elements.

It may be arranged in the third aspect of the present invention that condenser means is provided for converging the light fluxes separated by the binary optical element and causing the converged light fluxes to be incident upon the picture elements, respectively.

It may be arranged in the third aspect of the present invention that optical synthesizing means is provided for synthesizing the modulated light fluxes outputted from the optical modulation element.

It may be arranged in the third aspect of the present invention that the optical synthesizing means comprises a binary optical element.

It may be arranged in the third aspect of the present invention that the optical modulation element comprises a liquid-crystal element.

According to the fourth aspect of the present invention, an optical modulator comprises a binary optical element for separating a light flux of a wide wavelength band into light fluxes of given wavelength bands; an optical modulation element for modulating the separated light fluxes through corresponding picture elements, respectively, and outputting them; and reflection means for reflecting the light fluxes transmitted through the optical modulation element, wherein the binary optical element synthesizes the light fluxes modulated by the optical modulation element.

It may be arranged in the fourth aspect of the present invention that means is provided for causing a main beam of each of the light fluxes separated by the binary optical element to be incident perpendicularly upon corresponding one of the picture elements.

It may be arranged in the fourth aspect of the present invention that condenser means is provided for converging the light flux of the wide wavelength band and causing the converged light flux to be incident upon each of the picture elements.

It may be arranged in the fourth aspect of the present invention that condenser means is provided for converging the light fluxes separated by the binary optical element and causing the converged light fluxes to be incident upon the picture elements, respectively.

It may be arranged in the fourth aspect of the present invention that the optical modulation element comprises a liquid-crystal element.

It may be arranged that the optical modulator according to any one of the first to fourth aspects of the present invention is used as a color image display device to realize a splendid apparatus.

BRIEF DESCRIPTION OF THE DRAWINGS

FIG. 8 is a sectional view of the main portion of a reflection-type optical modulator according to the present invention;

DETAILED DESCRIPTION OF THE PREFERRED EMBODIMENTS

Figure 1:
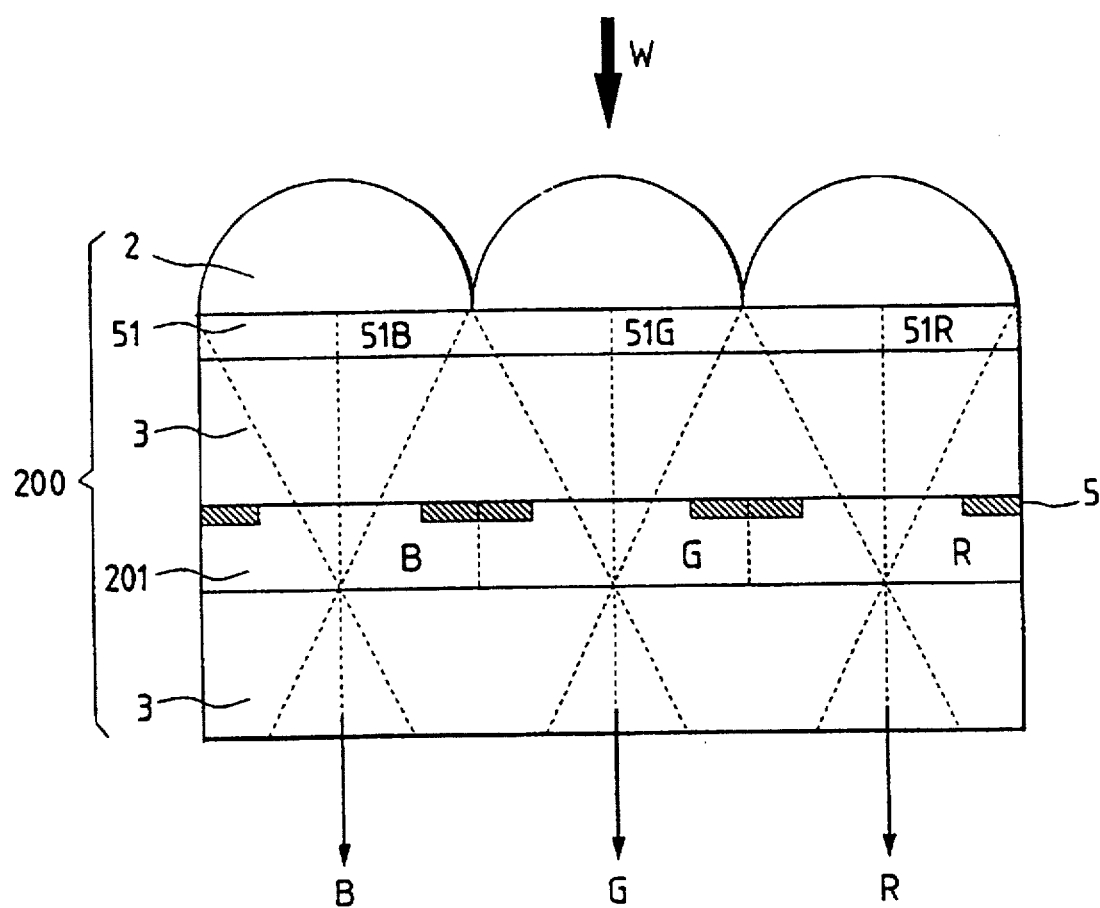
FIG. 1 is a sectional view of the main portion of a conventional optical modulator.
Figure 2:
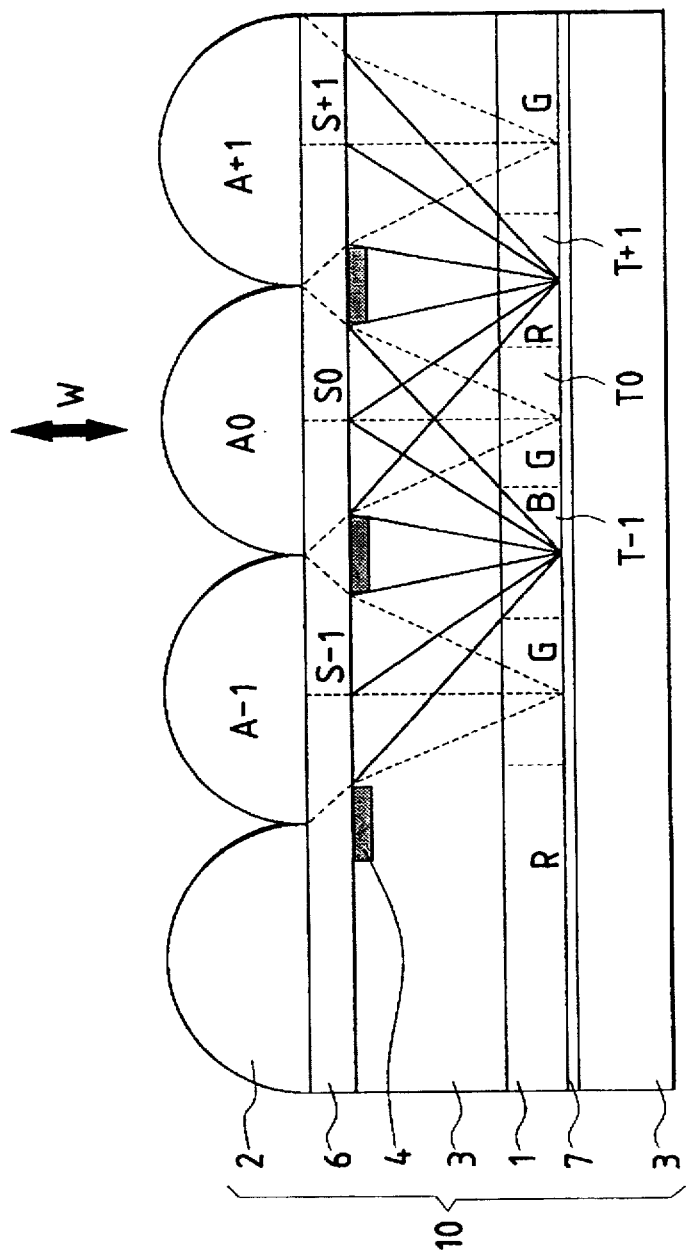
FIG. 2 is a sectional view of the main portion of a reflection-type optical modulator according to the present invention.

FIG. 2 is a sectional view (a section parallel to an optical axis of the modulator) of an optical modulator, best showing a feature of the present invention.

In the figure, numeral 1 denotes an optical modulation element including an optical modulation control section and an optical modulation controlled section. In this embodiment, the Polymer Dispersed (Network) liquid crystal, namely, PDLC or PNLC is used for the optical modulation controlled section. Numeral 2 denotes a condenser element group for condensing the incident light, numeral 3 transparent substrates holding the optical modulation element 1 therebetween, and numeral 4 shading films for shading light unnecessary for an image display. Numeral 6 denotes a color separating/synthesizing element provided one-to-one relative to the condenser element group 2. The color separating/synthesizing element 6 separates the light condensed through the condenser element group 2 into a plurality of color lights and further synthesizes the color lights reflected from the optical modulation element 1 for irradiation. Numeral 7 denotes a reflection plate interposed between the optical modulation element 1 and the transparent substrate 3.

In the figure, symbols R (red), G (Green) and B (blue) of the optical modulation elements 1 represent wavelength bands of the light which the respective picture elements of the optical modulation elements receive and reflect.

In FIG. 2, it is set that an arbitrary condenser element is A0, condenser elements adjacent to A0 are A+1 and A−1, a picture element of the optical modulation element including an optical axis (a center line of a condensed light flux) of A0 is T0, picture elements adjacent to T0 are T+1 and T−1, a color separating/synthesizing element including the optical axis of A0 is S0, and color separating/synthesizing elements adjacent to SO are S+1 and S−1. The white light flux condensed through A0 passes through the color separating/synthesizing element S0, and then are separated into three color lights of the R, G and B bands which are incident upon the optical modulation elements T0, T+1 and T−1 and reflected by the reflection plate 7. The light fluxes of the respective wavelength bands are subjected to optical modulation before going out through the optical modulation elements T0, T+1 and T−1. The light of the G wavelength band modulated by the optical modulation element T0 is synthesized at the optical modulation element S0 with the light of the R wavelength band separated through the color separating/synthesizing element S+1 and modulated through the optical modulation element T+1 and the light of the B wavelength band separated through the color separating/synthesizing element S−1 and modulated through the optical modulation element T−1, and then formed into essentially parallel lights at the condenser element A0 so as to be irradiated.

In the figure, refraction of the light between different mediums is not shown. Upon actual designing, a difference in refraction factor should be considered. This also applies to the subsequent figures where the light is shown.

Since the principle of optical modulation based on the PDLC or PNLC dispersion liquid crystal is known in general, explanation thereof is omitted.

Now, an example of an image signal driving method in a liquid-crystal panel according to this embodiment will be briefly explained.

When an input image is a video signal, an image signal corresponding to one frame of the image to be displayed is temporarily stored in a memory, and then, sampling is performed by shifting the order in sequence so as to correspond to an arrangement of the picture elements in the panel. On the other hand, in case of an input image already stored in the memory like a data signal of a personal computer or the like, it can be dealt with by changing the sampling method. In this embodiment, since the panel picture elements of the respective colors on each line are different, the image signal corresponding to the color light with a small number of picture elements should be subjected to an image processing, such as averaging two picture elements of the original image signal to one picture element, before the sampling.

Now, the color separating/synthesizing element group 6 will be explained using an enlarged sectional view of FIG. 3.

In this embodiment, the color separating/synthesizing element group 6 is in the form of a binary optical element (BOE) molded of resin. As shown in FIG. 3, the BOE in this embodiment is a step-formed diffraction grating. The BOE is arranged to concentrate a large part of the energy onto 0-order and ±first-order diffracted light by specifying the lattice pitch and the phase change amount, and further arranged to correspond to one of the R, G and B wavelength bands, the energy-highest wavelength bands (main wavelength bands) of the 0-order and ±first-order light. In this embodiment, the BOE has three steps with step widths L1, L2 and L3 in the lattice pitch P. It can be arranged to achieve similar effects if the number of steps is no less than 3, for example, 4 or 5. As disclosed in Applied Optics, volume 17, No. 15, 2273-2279 (Aug. 1, 1978), in the transmission-type BOE as shown in this embodiment, the incident light flux incident upon the BOE is transmission-diffracted and separated mainly in three directions. In this BOE, assuming that the blazed wavelength is λ0, a lattice thickness Dt necessary for the blazed wavelength λ0 is given by $$Dt = m \cdot \lambda 0 / (n\lambda 0 - 1)$$

wherein nλ0 represents the refraction factor of the medium.

Given that m=2, λ0=530 nm and nλ0=about 1.5, the lattice thickness is calculated to be about Dt=2120 nm.

In this embodiment, it is arranged that, between the color separating/synthesizing elements being adjacent in a diffraction direction of the input light, the main wavelength bands of +first-order diffracted light and −first-order diffracted light are reversed to each other. Specifically, in FIG. 3, assuming that the light separated to the left is +first-order diffracted light and the light separated to the right is −first-order diffracted light, the color separating/synthesizing element S0 diffracts the light with the main wavelength band being B to +first-order side and the light with the main wavelength band being R to −first-order side. On the contrary, each of the color separating/synthesizing elements S+1 and S−1 diffracts the light with the main wavelength band being R to +first-order side and the light with the main wavelength band being B to −first-order side.

In the foregoing, the color separation has been explained. By taking inverse the course of the light, the synthesizing action of the three color light can also be explained.

Figure 4:
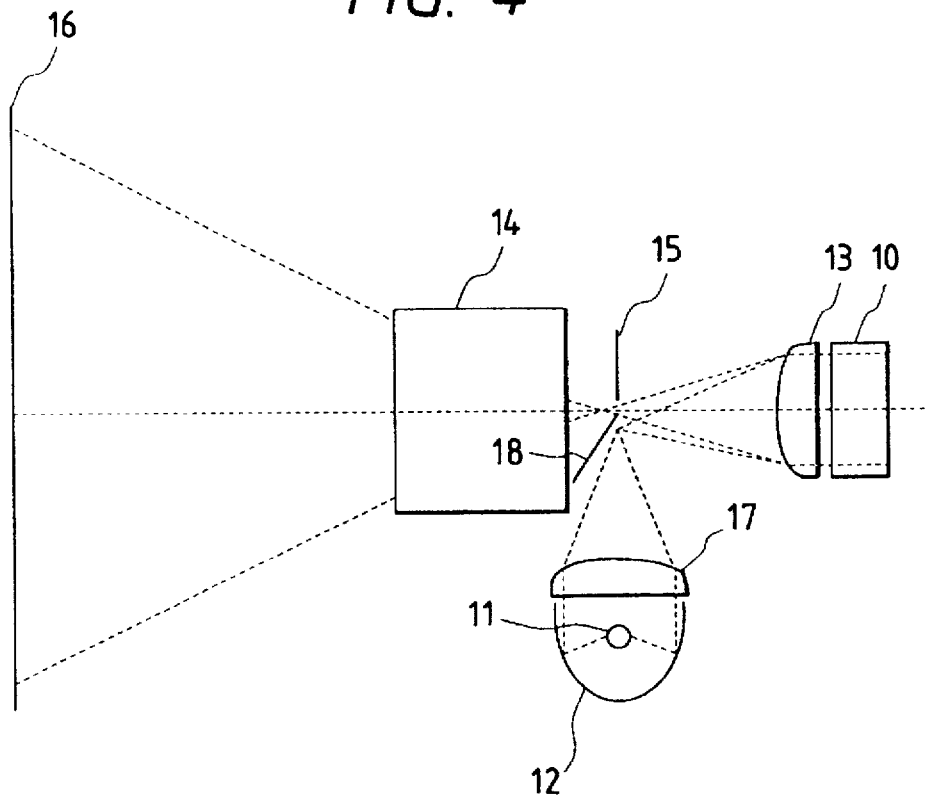
FIG. 4 is a schematic view of a color image display device according to the present invention.

FIG. 4 is a diagram schematically showing a reflection-type color image display device employing the optical modulator 10.

In FIG. 4, numeral 10 denotes the optical modulator of the present invention, numeral 11 a white light source disposed at a focal point of a parabolic mirror, numeral 13 a condenser lens, numeral 14 a projection lens, numeral 15 a projection lens diaphragm, numeral 16 a projection screen, numeral 17 a condenser lens, and numeral 18 a mirror of the projection lens diaphragm located at a side of the white light source.

The light emitted from the white light source 11 is caused to be essentially parallel lights through the parabolic mirror 12, and then incident upon the optical modulator 10 via the condenser lens 17, the mirror 18 and the condenser lens 13. The light given image data for each of the R, G and B lights by the optical modulator 10 performs the image display on the projection screen 16 via the condenser lens 13 and the projection lens 14.

The image data of the respective R, G and B lights depends on the diffusion degree of the light flux through the optical modulator 10. When using a diaphragm having an opening on the optical axis as shown in FIG. 4, the light flux of a low diffusion degree passes the projection lens diaphragm 15 to reach the projection screen 16, while the light flux of a high diffusion degree is interrupted by the projection lens diaphragm 15 so as not to reach the projection screen 16. Specifically, by changing the diffusion degree of the light flux of each picture element in the optical modulator 10, the light energy which reaches the projection screen 16 can be changed so that the gradation display of the image is rendered possible. Even in case of a diaphragm which interrupts the light flux around the optical axis contrary to the structure shown in FIG. 4, the similar gradation display of the image is also rendered possible.

With the foregoing arrangement, since the white light incident upon the optical modulator 10 is separated into a plurality of color lights by means of the color separating/synthesizing element 6 which are then condensed onto the optical modulation elements corresponding to the respective color lights without waste, the light utilization efficiency can be largely improved. At the same time, by using the optical modulator 10 of the present invention in the color image display device, the bright device can be provided without increasing the size of the device. Further, since the periodic structure (RGB mosaic structure and black matrix) of the optical modulator is not observed on the screen and the image display with the fully synthesized R, G and B lights can be achieved on the screen, the high-quality image can be enjoyed even at a short distance from the screen. Further, since the incident light flux is condensed relative to each picture element, the picture element of a low aperture rate can be adopted. Thus, various merits can be achieved, for example, increasing the yield on manufacturing of the optical modulation elements.

Figure 5:
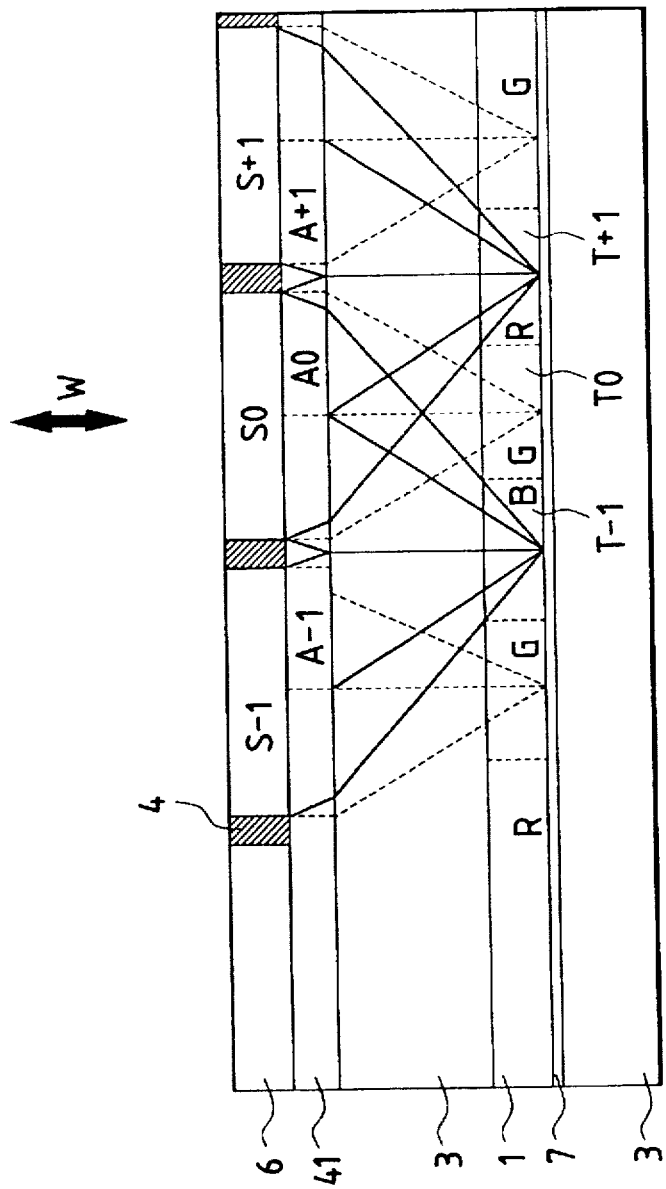
FIG. 5 is a sectional view of the main portion of a reflection-type optical modulator according to the present invention.

In this embodiment, although the transmission-type BOE is used as the color separating/synthesizing element, another color separating/synthesizing element, such as a hologram, may be used. Further, the condenser element may be in the form of a flat plate microlens. Moreover, the arrangement order of the condenser element and the color separating/synthesizing element may be reversed as shown in FIG. 5. In FIG. 5, numeral 41 denotes a condenser element group, such as the flat plate microlenses. Further, the color separating/synthesizing element may be formed integral with the condenser element group or the transparent substrate.

Figure 3:
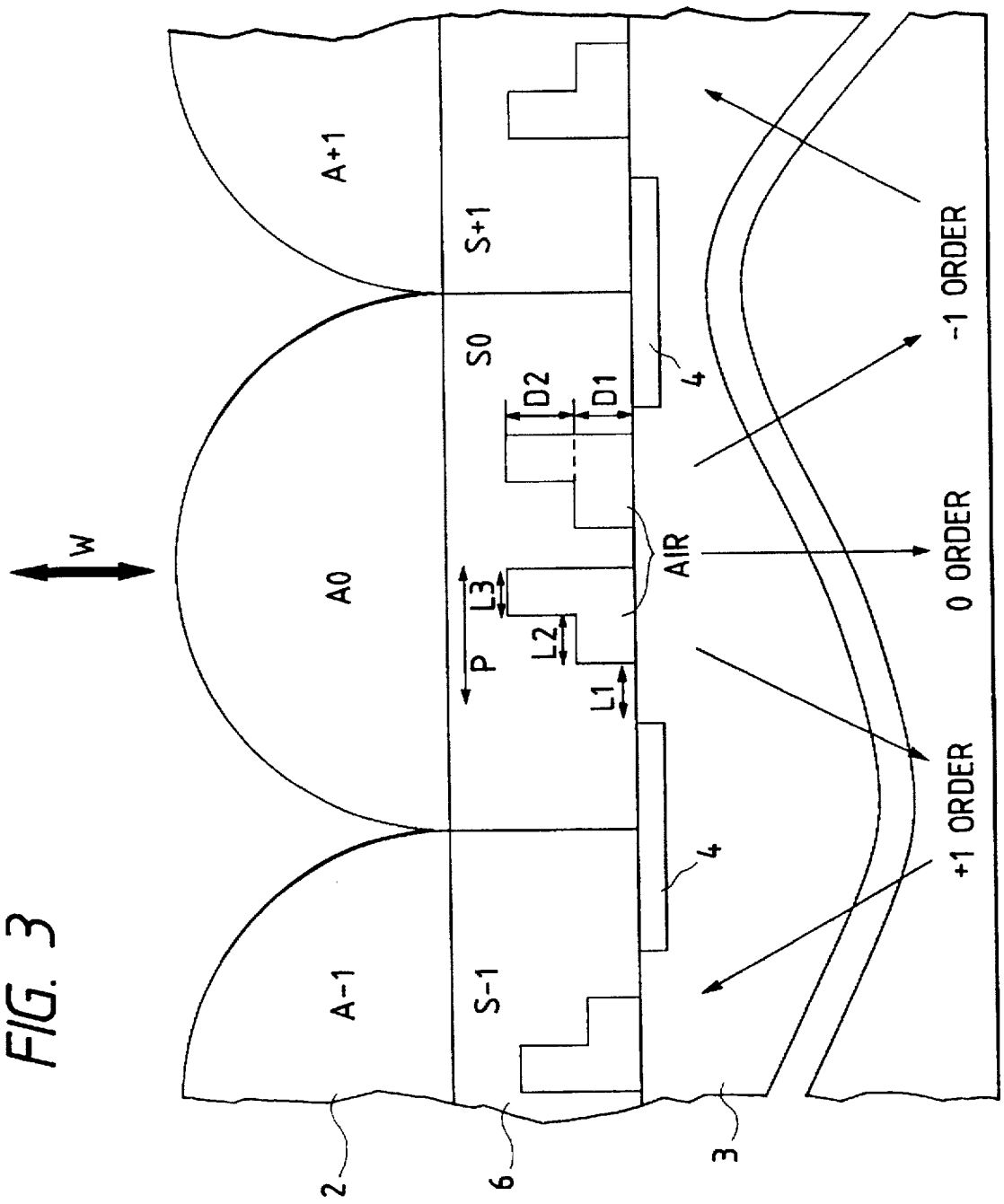
FIG. 3 is an enlarged sectional view of a color separating/synthesizing element.

In this embodiment, the number of pitches in one of the color separating/synthesizing elements is two as shown in FIG. 3. However, it is necessary to change it depending on the specification of the optical modulator. Further, by changing the lattice thickness in one pitch of the diffraction grating per stage to some degree and designing the BOE shape so as to render the lattice widths in one pitch of the diffraction grating unequal, the sideband components in ±first-order diffracted light can be reduced so that the ideal color separation can be further made possible. Further, the reflection plate 7 may be formed by a metal layer forming the wiring portion of the optical modulation element 1.

Figure 6:
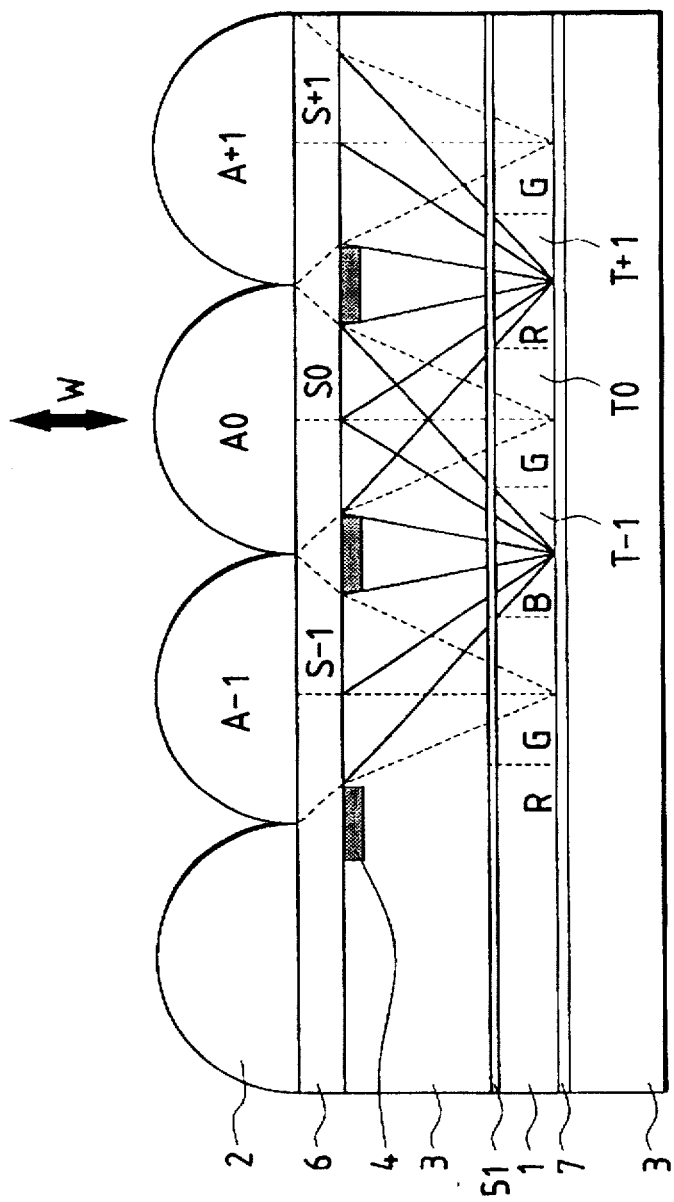
FIG. 6 is a sectional view of the main portion of a reflection-type optical modulator according to the present invention.

As shown in FIG. 6, color correction color filters 51 may be provided at portions where the respective color lights are separated. In this arrangement, if the spectral characteristics of the respective color lights separated through the color separating/synthesizing elements 6 differ from those of the image signal, by causing the color lights to be incident upon the color correction color filters 41 to obtain the ideal color data, the true image color reproduction can be achieved. In this case, since the light is transmitted through the color filters 51 after separation into the respective color lights, the lowering of the light utilization efficiency is not generated so much.

Figure 7:
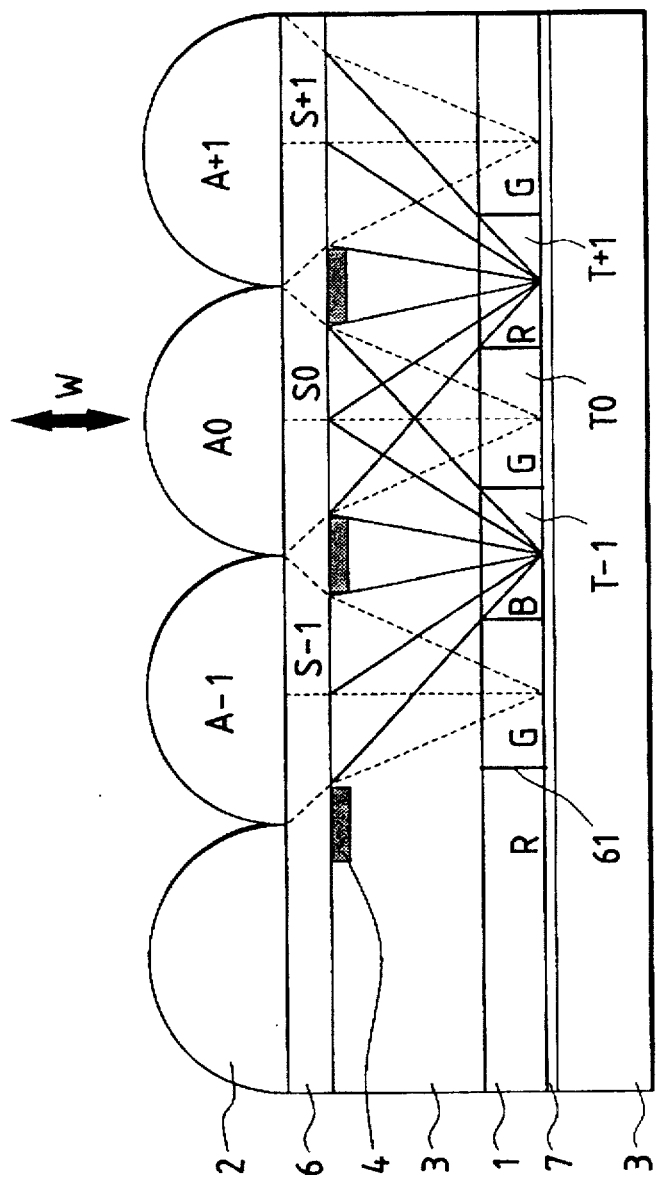
FIG. 7 is a sectional view of the main portion of a reflection-type optical modulator according to the present invention.

As shown in FIG. 7, shading walls 61 may be provided between the optical modulation elements for preventing the diffusion light of the PDLC or PNLC from entering the adjacent elements to cause the crosstalk. With this arrangement, the higher-quality color image display device can be provided.

Naturally, it may also be arranged that both the color filters 51 shown in FIG. 6 and the shading walls 61 shown in FIG. 7 are simultaneously provided.

FIG. 8 shows another preferred embodiment of an optical modulator.

In FIG. 8, elements assigned the same reference marks as those in FIG. 2 work similarly so that explanation thereof is omitted.

An optical modulator 20 in FIG. 8 largely differs from the optical modulator in FIG. 2 in that the TN liquid crystal is used for a optical modulation element group 21 as an optical modulation control section. Following this, the optical modulator 20 in this embodiment includes polarizing plates 22.

Figure 9:
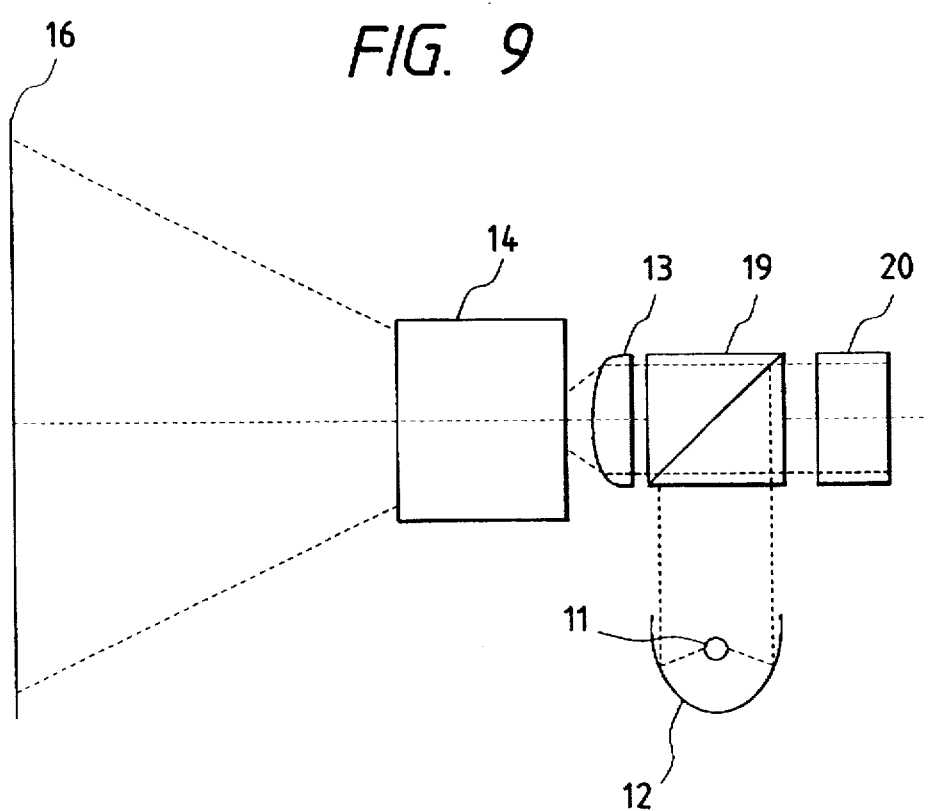
FIG. 9 is a schematic view of a color image display device according to the present invention.

FIG. 9 is a diagram schematically showing a reflection-type color image display device incorporating the optical modulator 20.

In FIG. 9, elements assigned the same reference marks as those in FIG. 4 work similarly so that explanation thereof is omitted. Numeral 19 denotes a polarizing beam splitter. By using the polarizing plates 22 and the reflection plate 7 which changes a light phase difference by $\pi$ upon reflection, the optical modulator 20 works as a shutter for controlling the transmission rate of the color light having the image data. Since a polarizing axis of the polarizing plate 22 and a direction of the liquid-crystal molecular arrangement can be determined univocally, explanation thereof is omitted.

By arranging the optical modulator as described above, similar effects can be achieved as in the case where the PDLC or PNLC is used for the optical modulation controlled section. Further, by using the TN liquid crystal, the image display device with high contrast can be provided.

Further, other than the TN liquid crystal, another optical modulation controlled section in the form of the guest host liquid crystal or the like may be used. In FIG. 9, if the polarizing separation accuracy of the polarizing beam splitter 19 is not sufficient, by adding one polarizing plate between the condenser lens 13 and the polarizing beam splitter 19, the contrast can be improved.

FIGS. 10 to 14 are plan views, respectively, of the optical modulator of the present invention, seen from the incident side thereof, for showing a relationship in arrangement of the picture elements of the optical modulation element and the condenser element.

Figure 10:
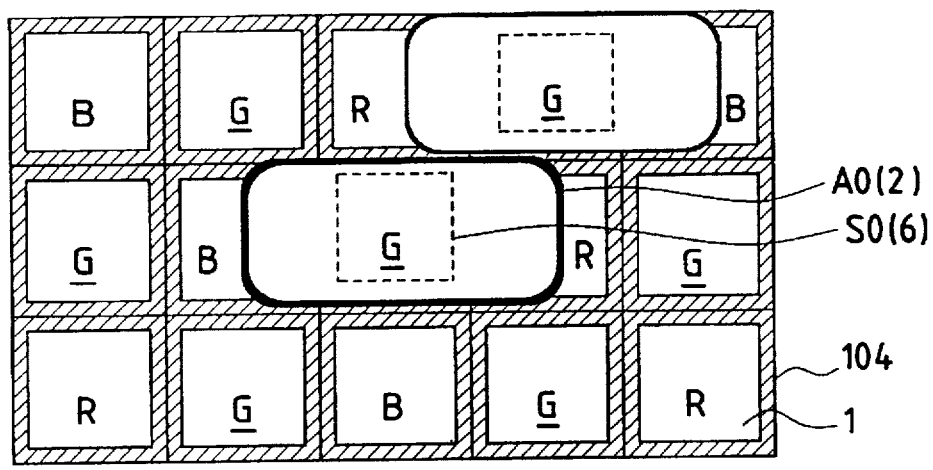
FIG. 10 is a diagram showing a relationship in arrangement of condenser elements and picture elements of an optical modulation element.

In FIG. 10, the incident lights (underlined alphabet in FIG. 10) to the picture elements of the optical modulation element including the optical axes of the condenser elements are set to G in the optical modulator of the present invention. Further, it is assumed that each of the condenser elements is of a shape having different refraction factors in a direction parallel to two sides of the picture element of the optical modulation element, and that the light flux incident upon the condenser element A0 is condensed onto the color separating element S0. Since the relative luminosity factor of the human eye as an observer is the highest at the G band, by arranging the picture elements of the optical modulation element and the condenser element as mentioned above, the bright image can be enjoyed. In FIG. 10, the picture element of the optical modulation element is shown to be square, but it may be rectangular.

Figure 11:
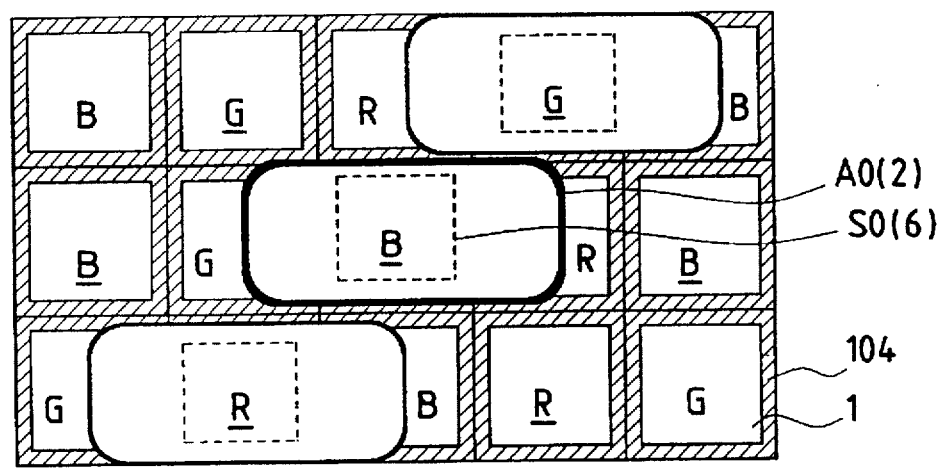
FIG. 11 is a diagram showing a relationship in arrangement of condenser elements and picture elements of an optical modulation element.

In FIG. 11, in the optical modulator of the present invention, the incident lights (underlined alphabet in FIG. 11) to the picture elements of the optical modulation element including the optical axes of the condenser elements of the condenser array extending in an arbitrary one-dimensional direction (transverse direction in the figure) are set to be the same and, assuming that the incident light is B, the incident lights to the condenser element arrays adjacent to the foregoing condenser element array are set to R and G. By arranging the condenser elements and the picture elements as mentioned above, since the numbers of all the optical modulation elements of the respective colors become equal to each other, the display device which facilitates the color balance adjustment can be provided.

Figure 12:
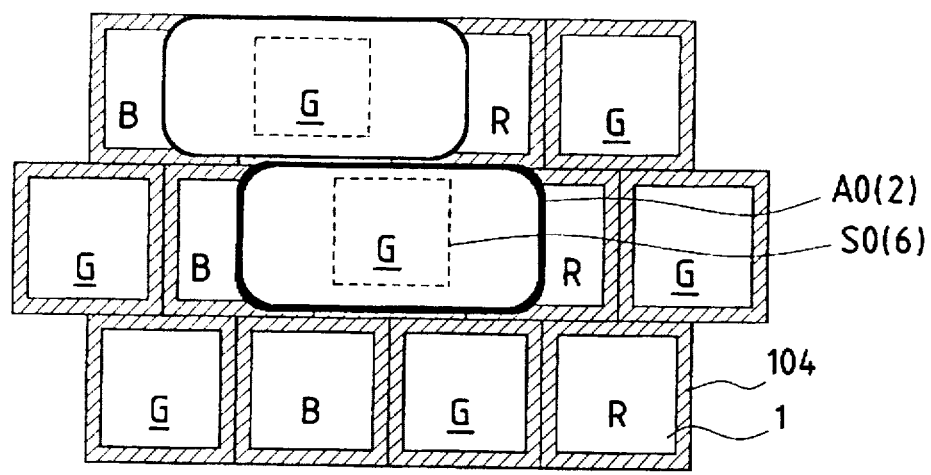
FIG. 12 is a diagram showing a relationship in arrangement of condenser elements and picture elements of an optical modulation element.

In FIGS. 10 and 11, the two-dimensional arrangement of the picture elements of the optical modulation elements is in the shape of lattice. On the other hand, similar effects can be achieved with a zigzag arrangement as shown in FIG. 12.

Figure 13:
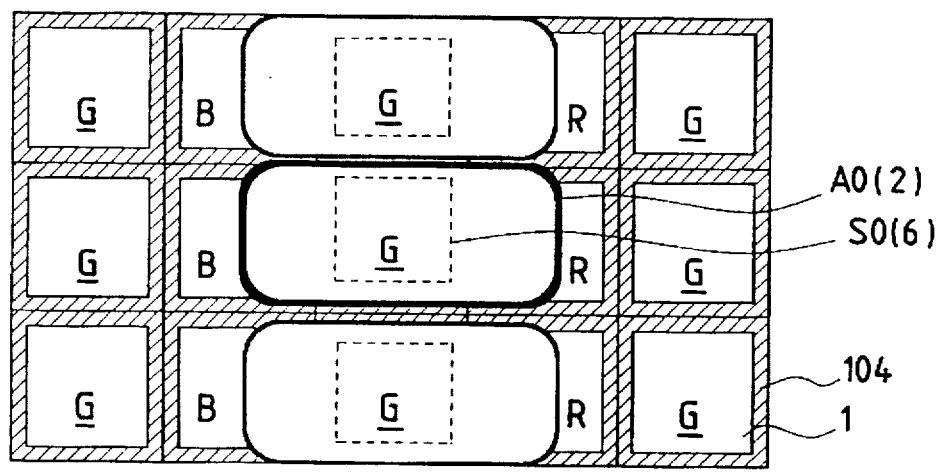
FIG. 13 is a diagram showing a relationship in arrangement of condenser elements and picture elements of an optical modulation element.
Figure 14:
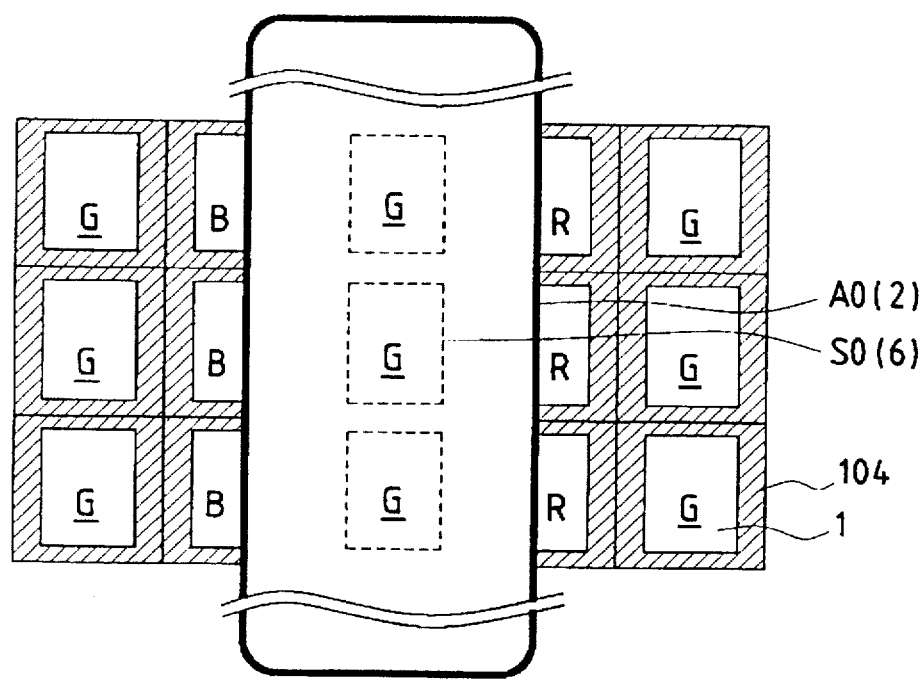
FIG. 14 is a diagram showing a relationship in arrangement of condenser elements and picture elements of an optical modulation element.

In FIG. 13, similar to FIG. 10, the incident lights to the picture elements of the optical modulation element including the optical axes of the condenser elements are all set to G, and simultaneously, the incident lights to the adjacent picture elements in a direction perpendicular to the direction of the color separation of the arbitrary color separating/synthesizing element are also set to G. By arranging the condenser elements and the picture elements of the optical modulation element, the formation of the BOE is facilitated since the BOE takes a shape continuous in a certain one-dimensional direction, so that reduction in cost can be achieved. Further, as shown in FIG. 14, the condenser element may be a lenticular lens. In this case, the black matrix structure in a direction having no power of the lenticular lens can not be removed and thus remains. However, by changing the black matrix structure holding the aperture rate constant, similar effects can be achieved as compared with FIG. 13.

Figure 15:
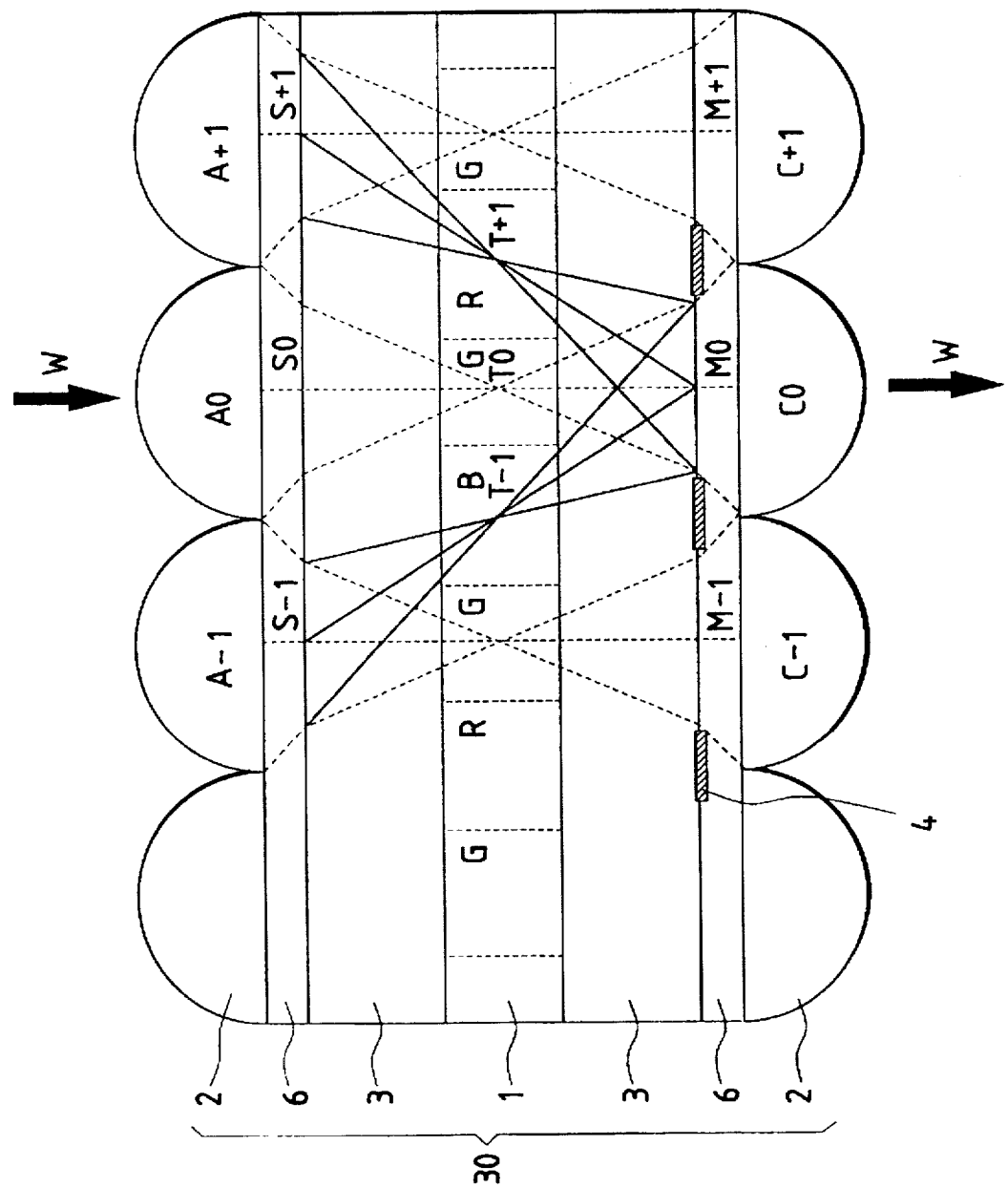
FIG. 15 is a sectional view of the main portion of a transmission-type optical modulator according to the present invention.

FIG. 15 is a diagram showing a transmission-type optical modulator 30. Elements assigned the same reference marks as those of the reflection-type optical modulator 10 have similar functions so that explanation thereof is omitted.

The transmission-type optical modulator 30 differs from the reflection-type optical modulator 10 in that the condenser element groups 2 and the color separating/synthesizing element groups 6 are provided in pairs at the incident and outgoing sides. Accordingly, the condenser element group 2 at the outgoing side works as collimator elements, while the color separating/synthesizing element group 6 at the incident side only performs the color separation and the color separating/synthesizing element group 6 at the outgoing side only performs the color synthesizing.

Now, an image forming operation of the optical modulator 30 will be described. Similar to FIG. 2, it is set that an arbitrary condenser element is A0, condenser elements adjacent to A0 are A+1 and A−1, a picture element of the optical modulation element including an optical axis (a center line of a condensed light flux) of A0 is T0, picture elements adjacent to T0 are T+1 and T−1, a color separating/synthesizing element, at the incident side, including the optical axis of A0 is S0, color separating/synthesizing elements adjacent to S0 are S+1 and S−1, a color separating/synthesizing element, at the outgoing side, including the optical axis of A0 is M0, color separating/synthesizing elements adjacent to M0 are M+1 and M−1, and a condenser element, at the outgoing side, including the optical axis of A0 is C0, condenser elements adjacent to C0 are C+1 and C−1. The white light flux condensed through A0 passes through the color separating/synthesizing element S0, and then are separated into three color lights of the R, G and B bands which are incident upon the optical modulation elements T0, T+1 and T−1 and subjected to optical modulation. The light of the G wavelength band modulated by the optical modulation element T0 is synthesized at the color separating/synthesizing element M0 with the light of the R wavelength band separated through the color separating/synthesizing element S+1 and modulated through the optical modulation element T+1 and the light of the B wavelength band separated through the color separating/synthesizing element S−1 and modulated through the optical modulation element T−1, and then formed into essentially parallel lights at the condenser element C0 so as to be irradiated.

Figure 16:
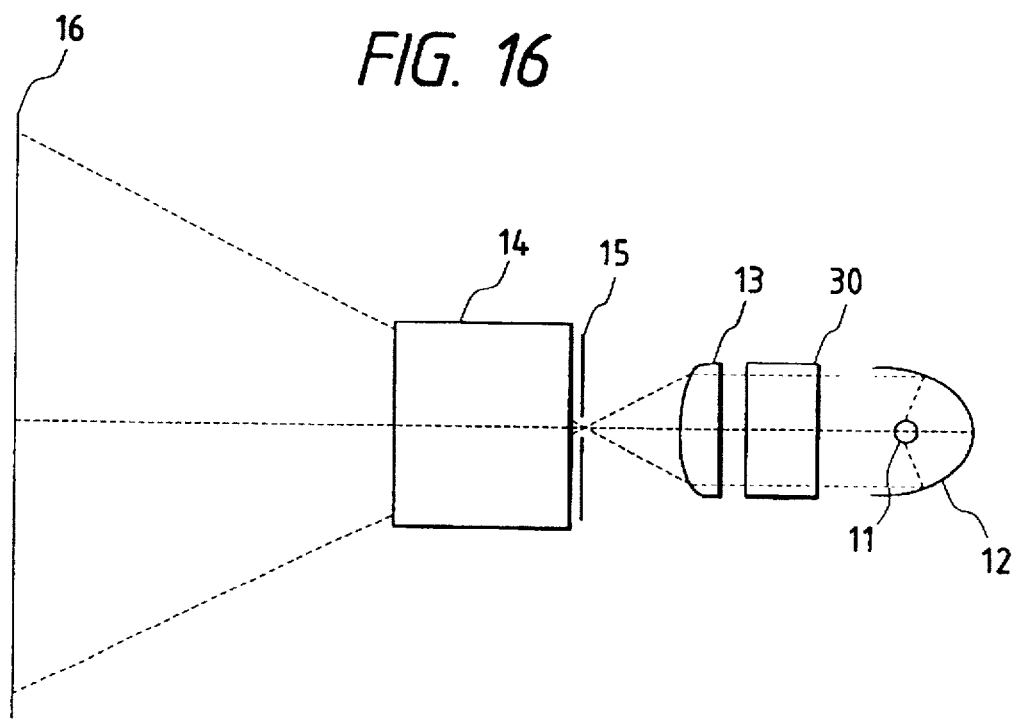
FIG. 16 is a schematic view of a color image display device according to the present invention.

FIG. 16 is a diagram schematically showing a transmission-type color image display device employing the optical modulator 30.

The light emitted from the white light source 11 is caused to be essentially parallel lights through the parabolic mirror 12, and then incident upon the optical modulator 30. The light given image data for each of the R, G and B lights by the optical modulator 30 performs the image display on the projection screen 16 via the condenser lens 13 and the projection lens 14.

The image data of the respective R, G and B lights depends on the diffusion degree of the light flux through the optical modulator 30. When using a diaphragm having an opening on the optical axis as shown in FIG. 16, the light flux of a low diffusion degree passes the projection lens diaphragm 15 to reach the projection screen 16, while the light flux of a high diffusion degree is interrupted by the projection lens diaphragm 15 so as not to reach the projection screen 16. Specifically, by changing the diffusion degree of the light flux of each picture element in the optical modulator 30, the light energy which reaches the projection screen 16 can be changed so that the gradation display of the image is rendered possible. Even in case of a diaphragm which interrupts the light flux around the optical axis contrary to the structure shown in FIG. 4, the similar gradation display of the image is also rendered possible.

Figure 17:
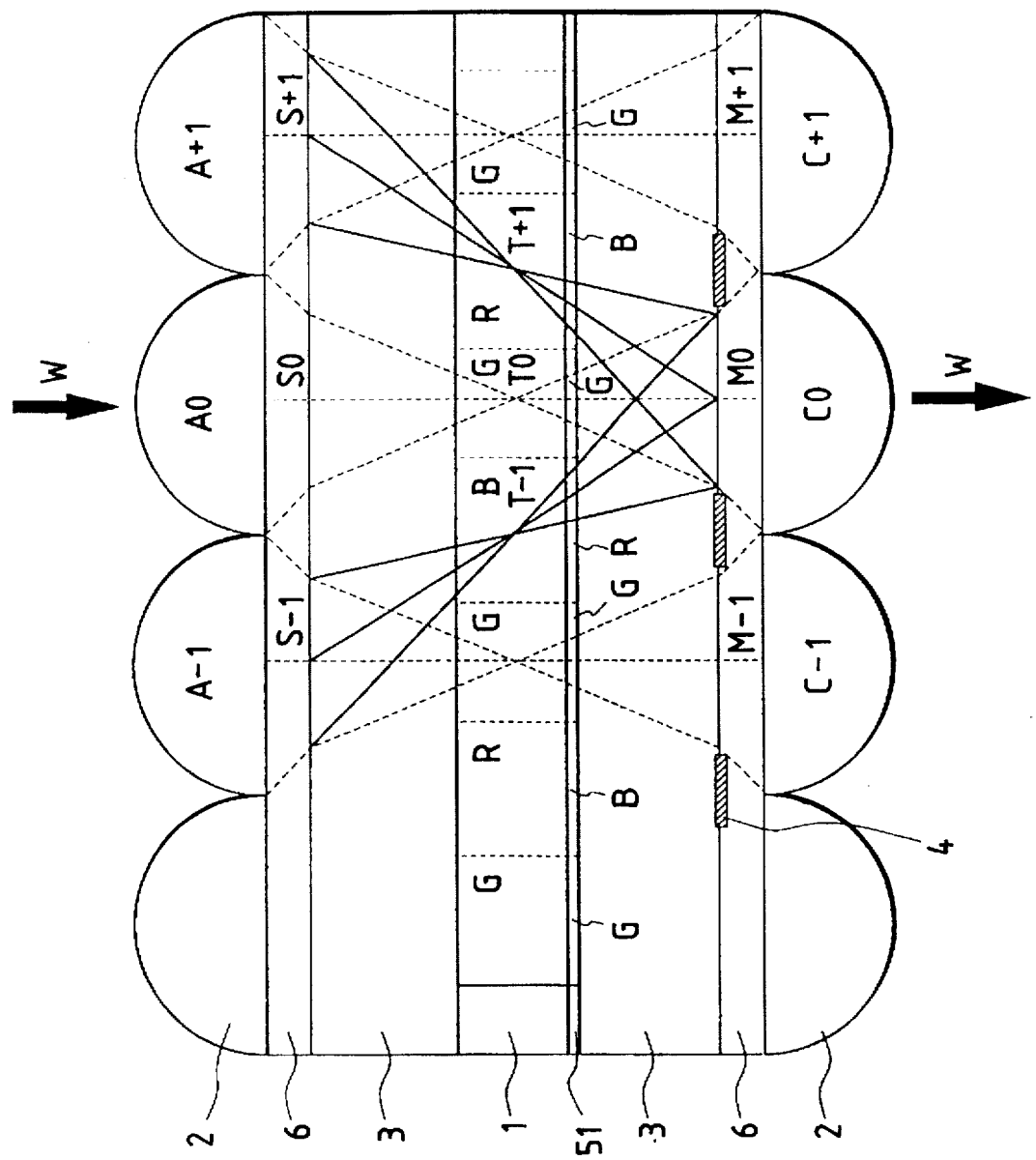
FIG. 17 is a sectional view of the main portion of a transmission-type optical modulator according to the present invention.
Figure 18:
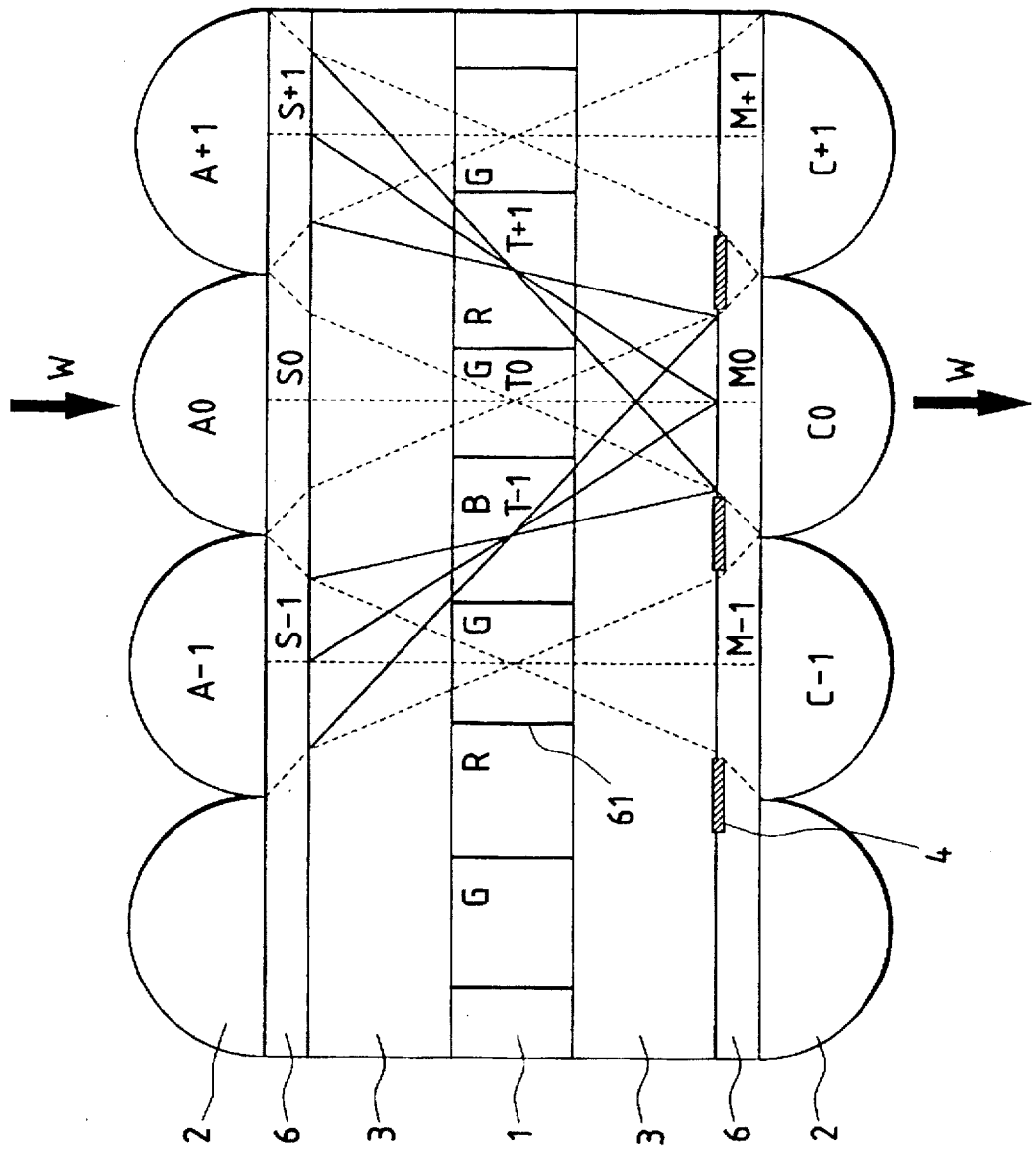
FIG. 18 is a sectional view of the main portion of a transmission-type optical modulator according to the present invention.

In FIG. 17, color correction color filters 51 are provided at portions where the respective color lights are separated in the optical modulator shown in FIG. 15. In FIG. 18, shading walls 61 are provided between the optical modulation elements of the optical modulator shown in FIG. 15. With this arrangement, the image display device with the high-quality image can be provided. The color correction color filters 51 may be provided in front of the optical modulation element group 1.

With the foregoing arrangement, the transmission-type color image display device can provide effects similar to those achieved in the reflection-type color image display device.

Figure 19:
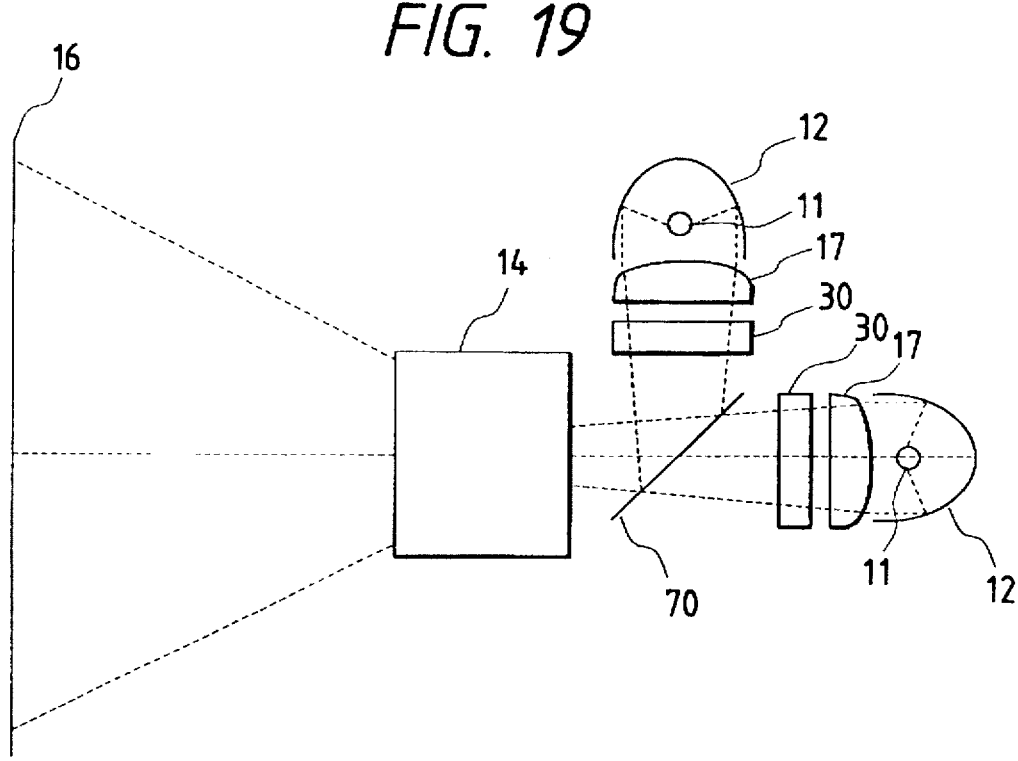
FIG. 19 is a schematic view of a color image display device according to the present invention.

In FIG. 16, the color image display device uses only one optical modulator 30. On the other hand, for displaying brighter image, it may be arranged that a pair of illumination/optical modulation units each including a light source 11, a parabolic mirror, a condenser lens 17 and an optical modulator 20, are used to fully synthesize the images. FIG. 19 shows this example.

With this arrangement, a device which requires the brighter image display, such as a device for business, can be provided with simple structure.

Figure 20:
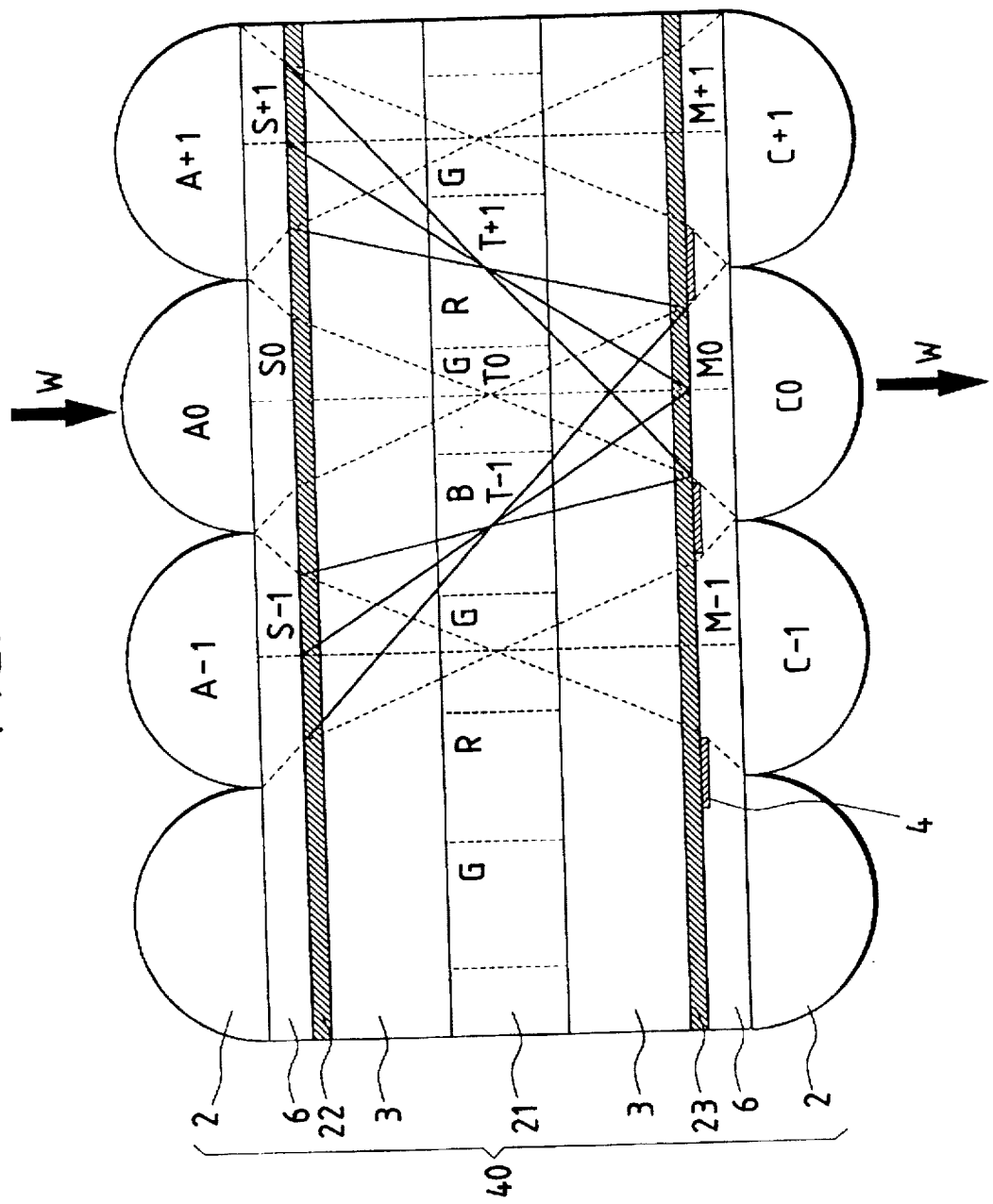
FIG. 20 is a sectional view of the main portion of a transmission-type optical modulator according to the present invention.

For the optical modulation controlled section, not only the PDLC or PNLC but also the TN liquid crystal can be used. FIG. 20 shows this structure. In FIG. 20, numeral 21 denotes an optical modulation element having an optical modulation controlled section in the form of the TN liquid crystal, and numerals 22 and 23 polarizing plates having polarizing axes orthogonal with each other.

Figure 21:
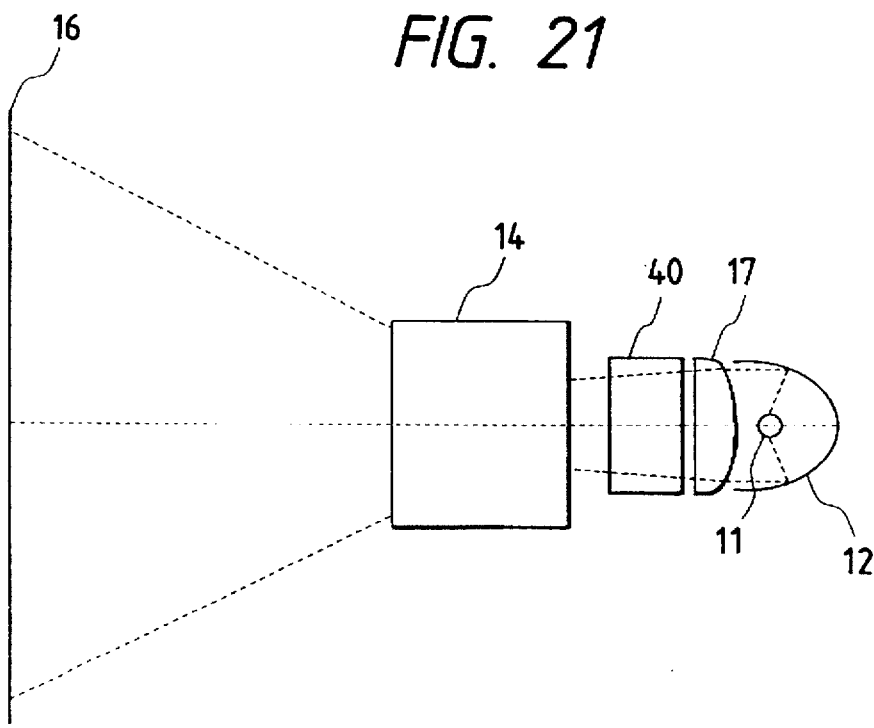
FIG. 21 is a schematic view of a color image display device according to the present invention.

FIG. 21 is a diagram schematically showing a color image display device employing this optical modulator. The optical system of the color image display device shown in FIG. 21 is called, in general, the Köhler illumination system, wherein an image of the light source is formed on the pupil of a projection lens and unevenness in light energy is small. Used in combination with the polarizing plates 22 and 23, an optical modulator 40 works as a shutter for controlling the transmission rate of the color light having the image data.

By arranging the optical modulator as described above, similar effects can be achieved as in the case where the PDLC or PNLC is used for the optical modulation controlled section. Further, by using the TN liquid crystal, the image display device with high contrast can be provided.

Further, other than the TN liquid crystal, another optical modulation controlled section in the form of the guest host liquid crystal or the like may be used.

Figure 22:
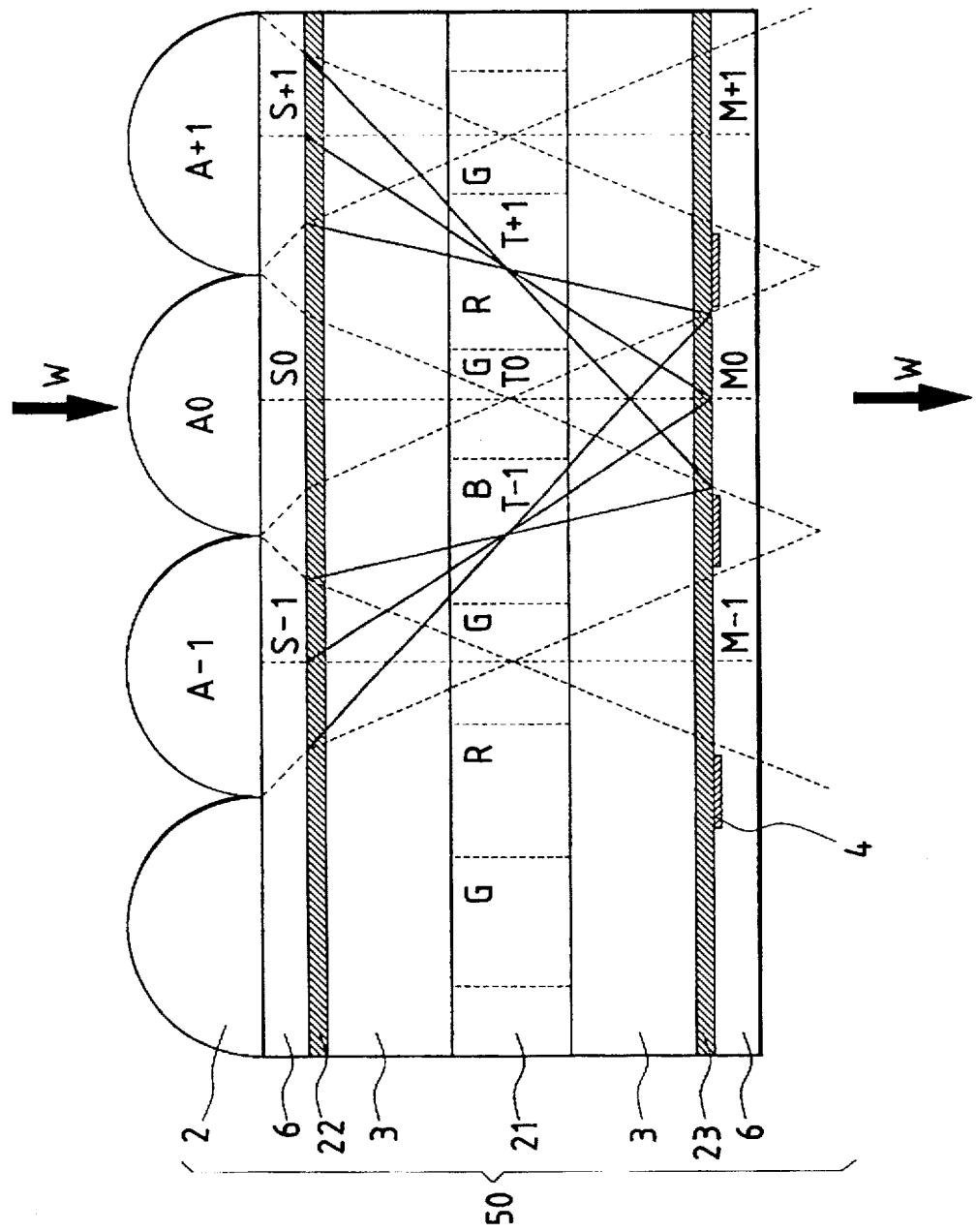
FIG. 22 is a sectional view of the main portion of a transmission-type optical modulator according to the present invention.

In FIG. 22, the condenser elements 2, at the outgoing side, having the collimator element function are removed from the optical modulator shown in FIG. 20. With this arrangement, the outgoing light flux of an optical modulator 50 spreads to a certain degree. In this case, as compared with the optical modulator 40 shown in FIG. 20, when F number of the projection lens is constant, the screen illuminance is somewhat lowered. However, since a thickness L of the glass substrate 3 relative to a size d of one picture element of the optical modulation element 21 is sufficiently large and a spreading angle of the outgoing light flux is significantly small, it is considered not to be a problem so much from a practical point of view. With this arrangement, the number of the optical elements can be reduced so that reduction in adjusting process and manufacturing cost can be achieved.

In the transmission-type optical modulator, the relationship in arrangement of the condenser elements and the picture elements of the optical modulation elements as shown in FIGS. 10 to 14 can also be applied.

Figure 23:
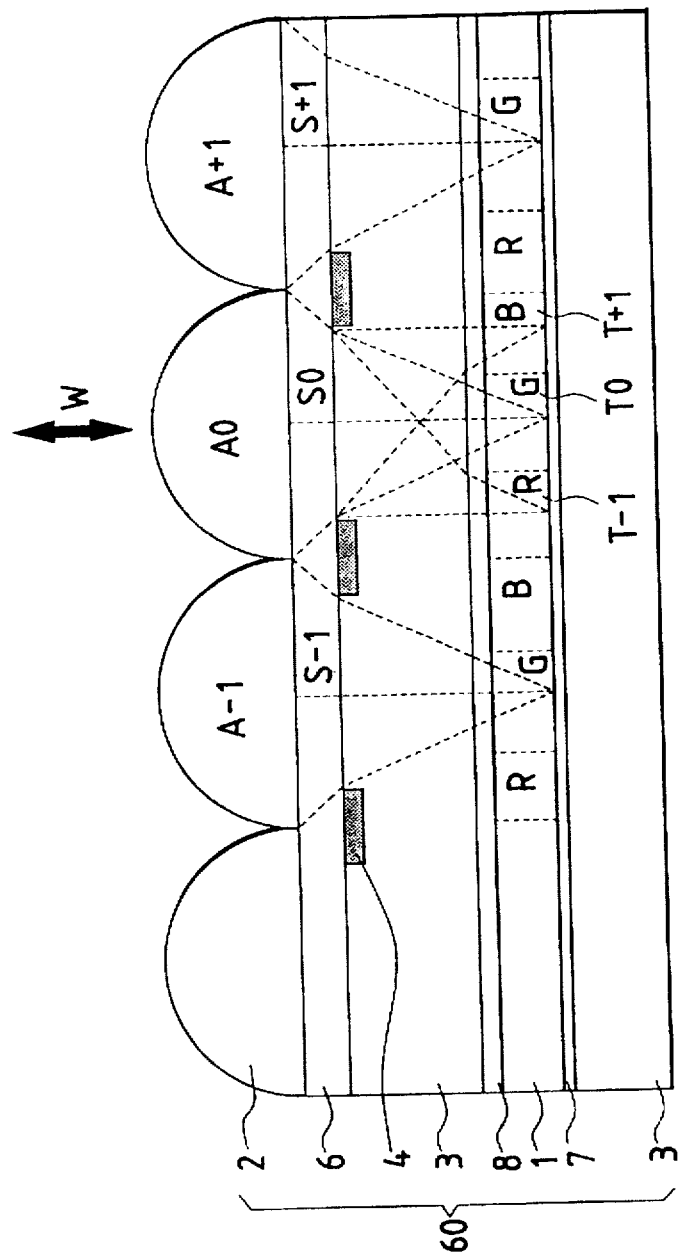
FIG. 23 is a sectional view of the main portion of a reflection-type optical modulator according to the present invention.

FIG. 23 is a diagram showing an optical modulator according to another preferred embodiment of the present invention.

In FIG. 23, elements assigned the same reference marks as those in FIG. 2 have similar functions so that explanation thereof is omitted. In an optical modulator 60 of this embodiment, a flat-plate microlens 8 is interposed between the transparent substrate 3 and the optical modulation elements 1. With this arrangement, the white light incident upon the condenser element A0 is separated through the color separating/synthesizing element S0 into the color lights of the R, G and B bands. The main beams of the respective color lights are deflected through the flat-plate microlens 8 so as to be perpendicular relative to the picture elements T0, T−1 and T+1 of the optical modulation element, and then incident upon the picture elements T0, T−1 and T+1 of the optical modulation element so as to be reflected by the reflection plate 8. The color lights modulated at the optical modulation element advances in the reverse direction on the optical paths so as to be incident upon the color separating/synthesizing element S0 where they are synthesized. Then, the synthesized light is caused to be parallel lights and irradiated from the optical modulator 60. Specifically, in the optical modulator 60 in this embodiment, three picture elements for the corresponding color lights correspond to one condenser element.

Figure 24:
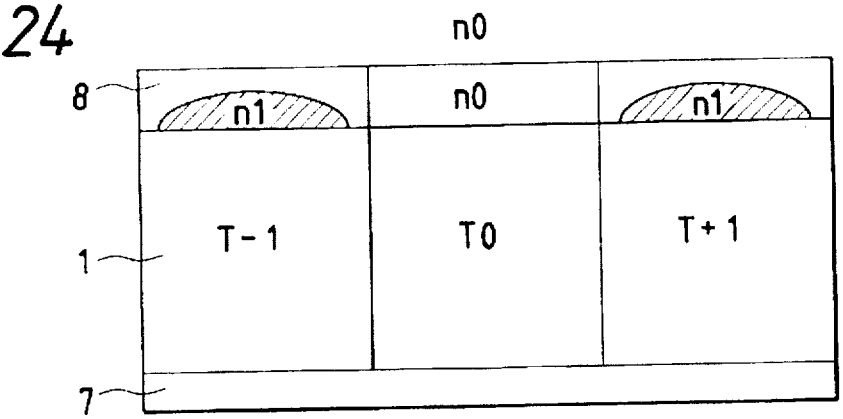
FIG. 24 is an enlarged sectional view of a flat-plate microlens.
Figure 25:
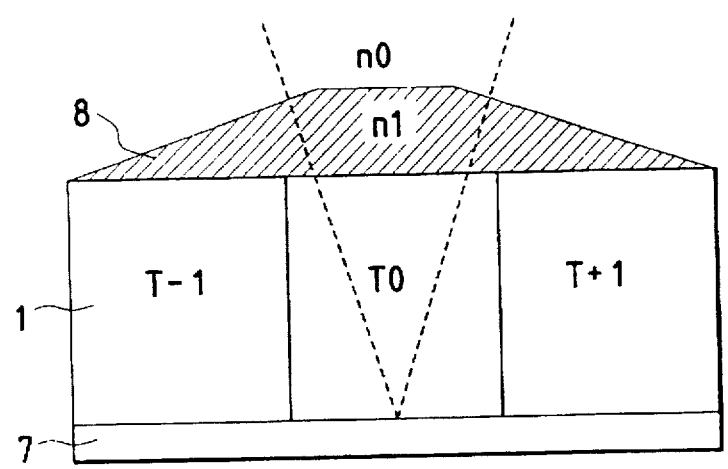
FIG. 25 is an enlarged sectional view of a flat-plate microlens.
Figure 26:
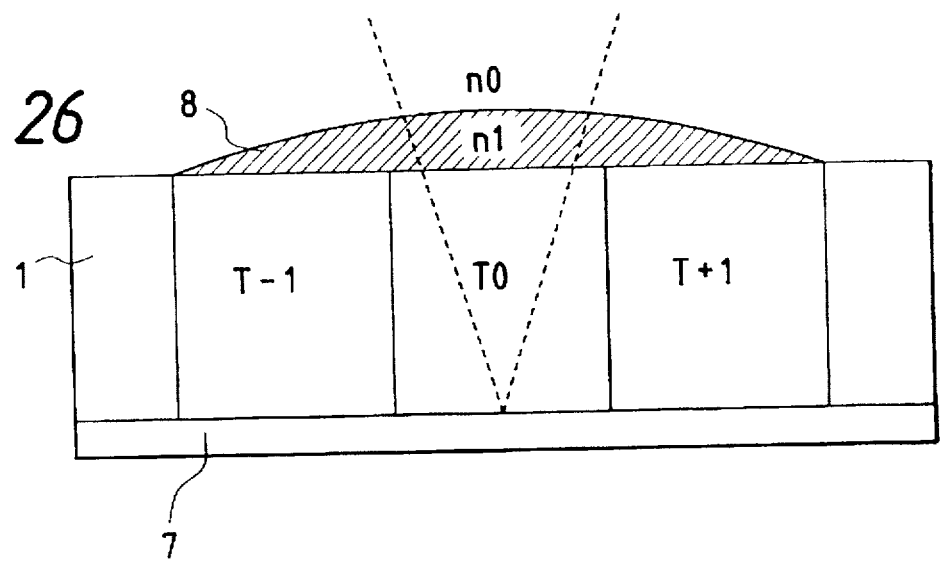
FIG. 26 is an enlarged sectional view of a flat-plate microlens.

As shown in FIG. 24, the flat-plate microlens 8 includes, as a base, a substrate having a refractive index n0 equal to that of the transparent substrate 3, and further includes lens portions for receiving and outputting the light relative to T−1 and T+1, whose refractive index n1 is set higher than n0. Although the flat-plate microlens is used in this embodiment, a trapezoidal lens as shown in FIG. 25 or a lenticular lens as shown in FIG. 26 may be used therefor.

Since a color image display device using the optical modulator 60 is the same as that shown in FIG. 4, explanation thereof is omitted.

By arranging the optical modulator as described above, effects similar to those achieved by the optical modulator shown in FIG. 2 can be achieved.

The color separating/synthesizing element 6 has not been explained in detail. As the element 6, one shown in FIG. 3 or one in which the outgoing directions of the respective color lights are the same can be used. In this embodiment, the latter is used.

In this embodiment, the BOE is used as the color separating/synthesizing element as in the foregoing preferred embodiments. However, another color separating element, such as a hologram, may be used. Further, the reflection plate 7 may be formed by a metal layer when forming the wiring portion of the optical modulation element 1. Further, the condenser element 2 may be in the form of a flat plate microlens. Further, the color separating element group 6 may be formed integral with the condenser element group 2 or the transparent substrate 3.

Figure 27:
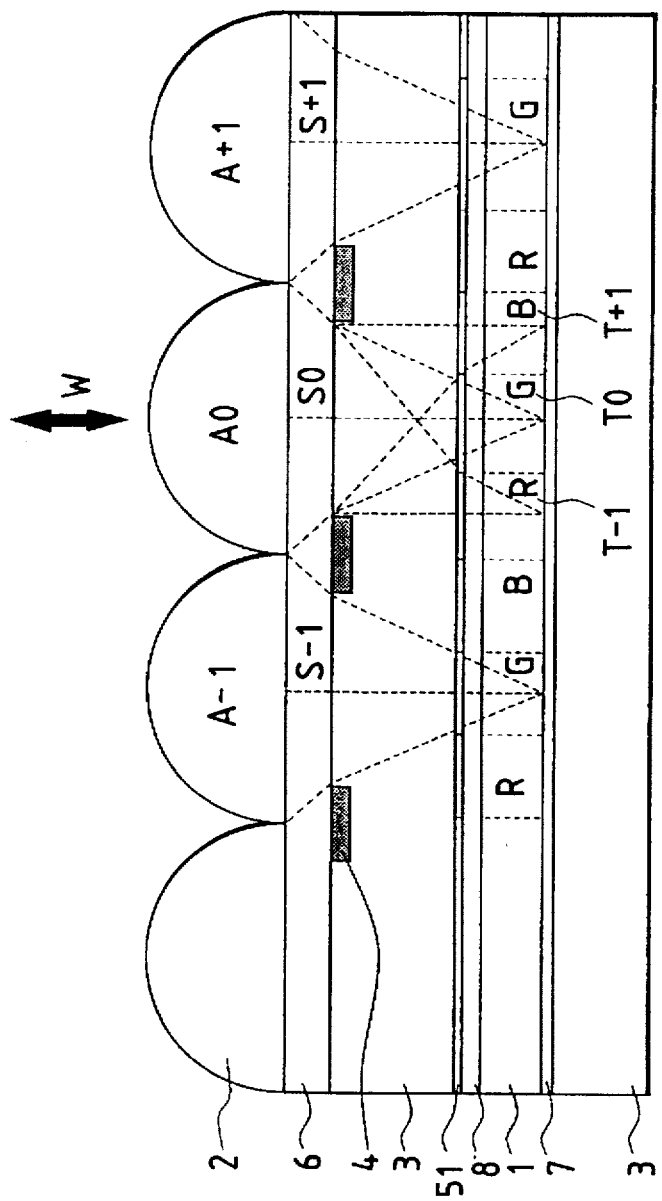
FIG. 27 is a sectional view of the main portion of a reflection-type optical modulator according to the present invention.
Figure 28:
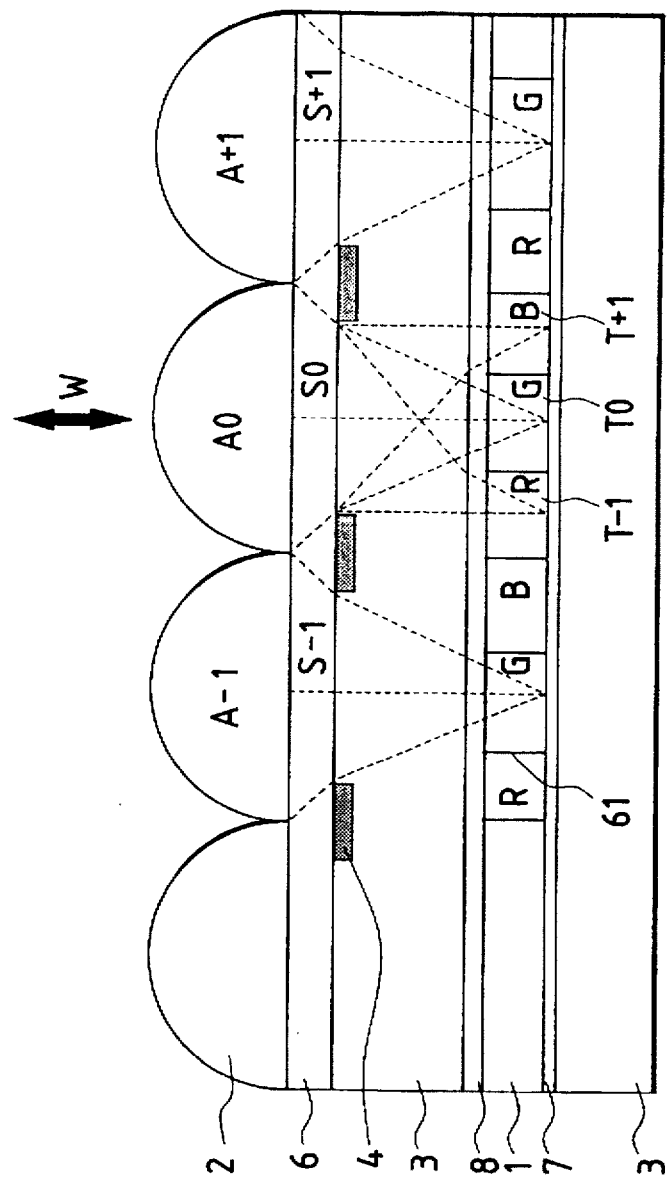
FIG. 28 is a sectional view of the main portion of a reflection-type optical modulator according to the present invention.

By providing the color filters 51 as shown in FIG. 27 or by providing the shading walls 61 between the optical modulation elements as shown in FIG. 28, the image display device with the high-quality image can be provided.

Figure 29:
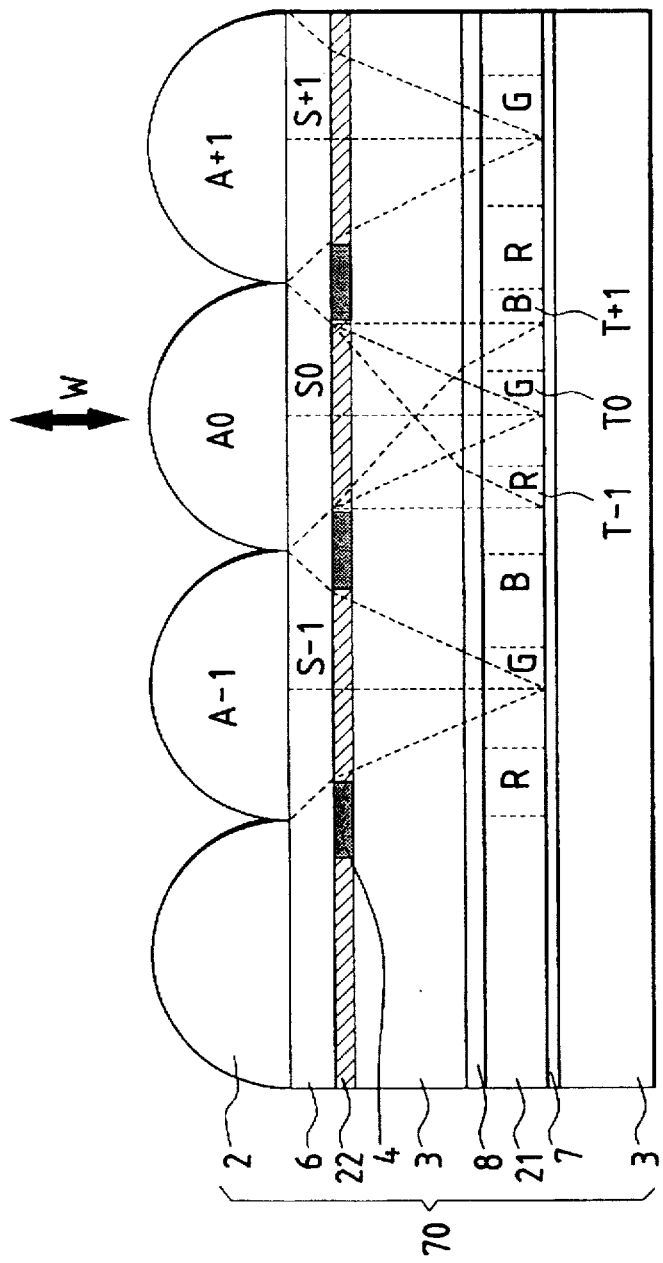
FIG. 29 is a sectional view of the main portion of a reflection-type optical modulator according to the present invention.

FIG. 29 shows the structure using the TN liquid crystal for the optical modulation controlled section. With this arrangement, effects similar to those achieved in the foregoing preferred embodiments can be achieved.

Since the structure of the color image display device is the same as that shown in FIG. 9, explanation thereof is omitted. In this embodiment, although the TN liquid crystal is used for the optical modulation controlled section, another optical modulation controlled section in the form of the guest host liquid crystal or the like may be used. Further, in FIG. 9, if the polarizing separation accuracy of the polarizing beam splitter 19 is not sufficient and thus an improvement in contrast is required, one polarizing plate may be added between the condenser lens 13 and the polarizing beam splitter 19.

FIGS. 30 to 33 are plan views, respectively, of the optical modulator of the present invention, seen from the incident side thereof, for showing a relationship in arrangement of the picture elements of the optical modulation element and the condenser element.

Figure 30:
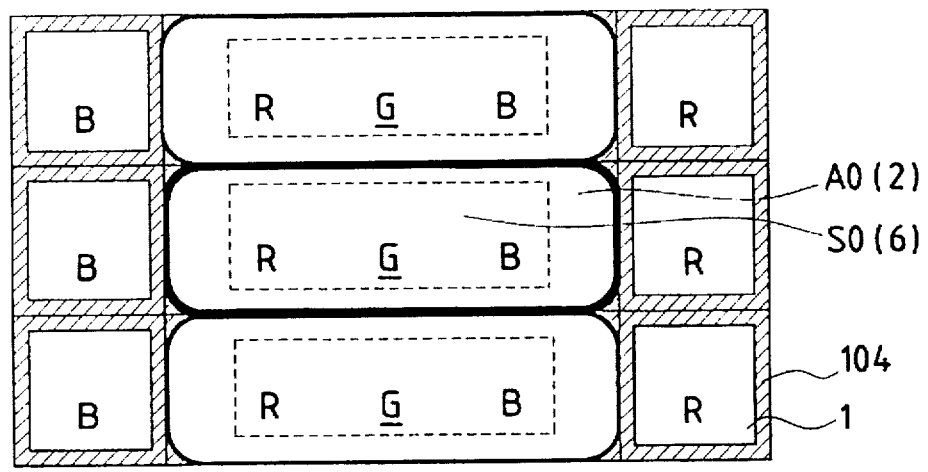
FIG. 30 is a diagram showing a relationship in arrangement of condenser elements and picture elements of an optical modulation element.

In FIG. 30, the incident lights (underlined alphabet in FIG. 30) to the picture elements of the optical modulation element including the optical axes of the condenser elements are set to G in the optical modulator of the present invention. Simultaneously, the incident lights to the adjacent picture elements in a direction perpendicular to the direction of the color separation of the arbitrary color separating/synthesizing element are also set to G. Further, it is assumed that each of the condenser elements is of a shape having different refraction factors in a direction parallel to two sides of the picture element of the optical modulation element, and that the light flux incident upon the condenser element A0 is condensed onto the color separating element S0. By arranging the picture elements of the optical modulation element and the condenser element as mentioned above, the formation of the BOE is facilitated since the BOE takes a shape continuous in a certain one-dimensional direction, and thus reduction in cost can be achieved.

Figure 31:
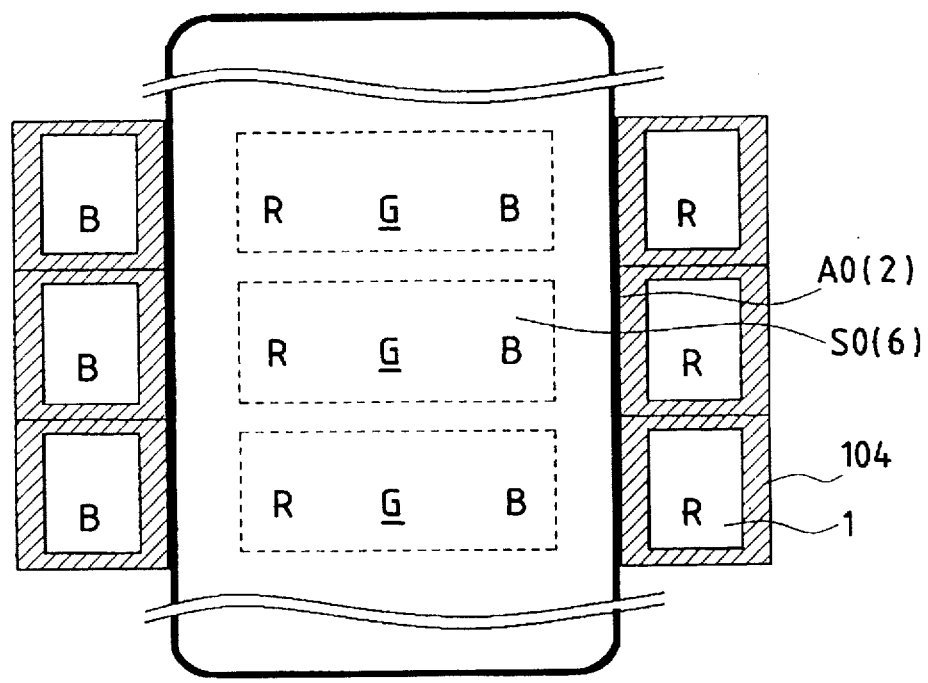
FIG. 31 is a diagram showing a relationship in arrangement of condenser elements and picture elements of an optical modulation element.

Further, as shown in FIG. 31, the condenser element may be a lenticular lens. In this case, the black matrix structure in a direction having no power of the lenticular lens can not be removed and thus remains. However, by changing the black matrix structure holding the aperture rate constant, similar effects can be achieved as compared with FIG. 30. Further, although the picture element of the optical modulation element is shown to be square, it may be rectangular.

Figure 32:
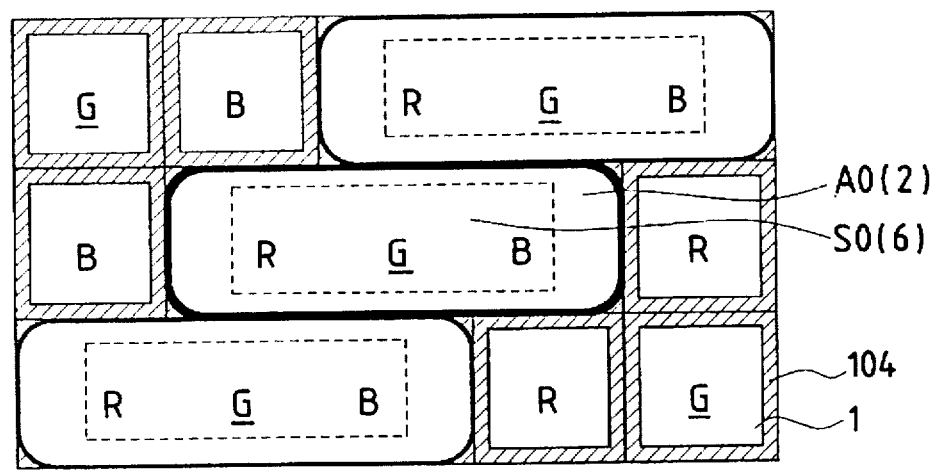
FIG. 32 is a diagram showing a relationship in arrangement of condenser elements and picture elements of an optical modulation element.
Figure 33:
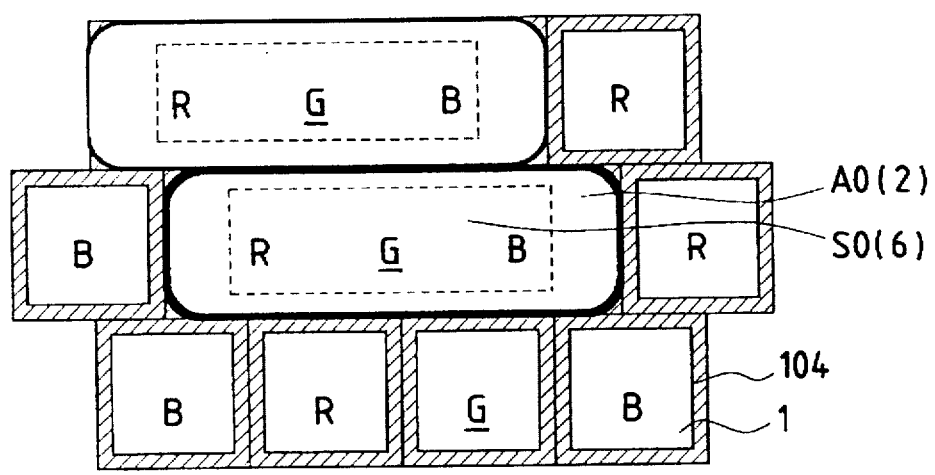
FIG. 33 is a diagram showing a relationship in arrangement of condenser elements and picture elements of an optical modulation element.

In FIG. 32, in the optical modulator of the present invention, the incident lights (underlined alphabet in FIG. 32) to the picture elements of the optical modulation element including the optical axes of the condenser elements are set to G, and the condenser elements 2 are set in a zigzag arrangement. By arranging the condenser elements and the picture elements as mentioned above, effects similar to those achieved in the structure shown in FIG. 30 can be achieved. In FIG. 32, the two-dimensional arrangement of the picture elements of the optical modulation elements is in the shape of lattice. On the other hand, similar effects can be achieved with the zigzag arrangement as shown in FIG. 33.

Figure 34:
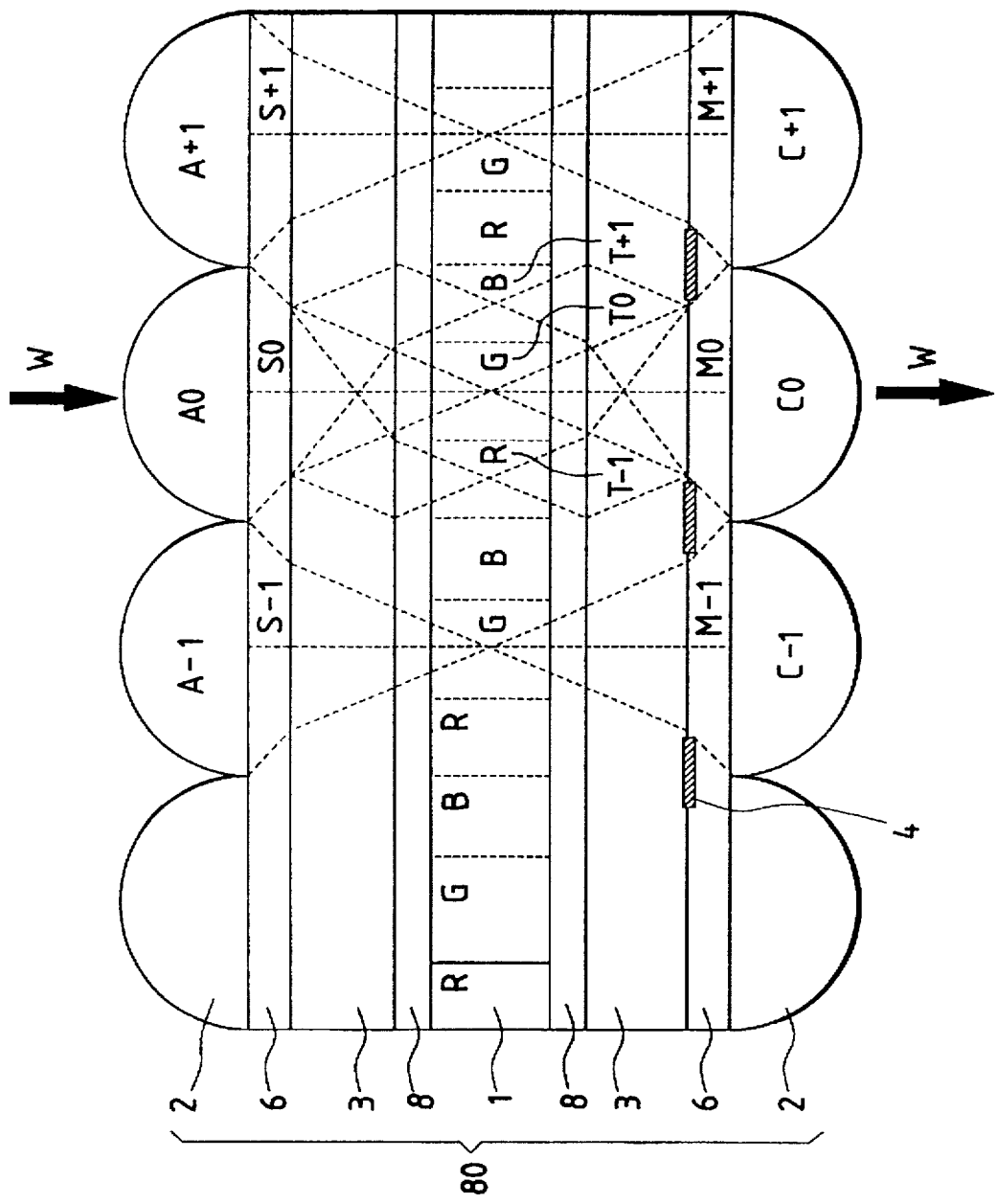
FIG. 34 is a sectional view of the main portion of a transmission-type optical modulator according to the present invention.

FIG. 34 shows a transmission-type optical modulator having the flat-plate microlens 8. Since the operation is the same as the reflection-type optical modulator 60 shown in FIG. 23 until the light is incident upon the picture elements T0, T0−1 and T0+1 of the optical modulation element, explanation thereof is omitted. The respective color lights modulated at the optical modulation elements T0, T0−1 and T0+1 and irradiated therefrom are bent in their optical paths by means of the flat-plate microlens 8 at the outgoing side so as to be incident upon the color separating/synthesizing element M0 where they are synthesized, and then irradiated from the condenser element C0 as parallel lights.

Since a color image display device is the same as that shown in FIG. 5, explanation thereof is omitted.

Figure 35:
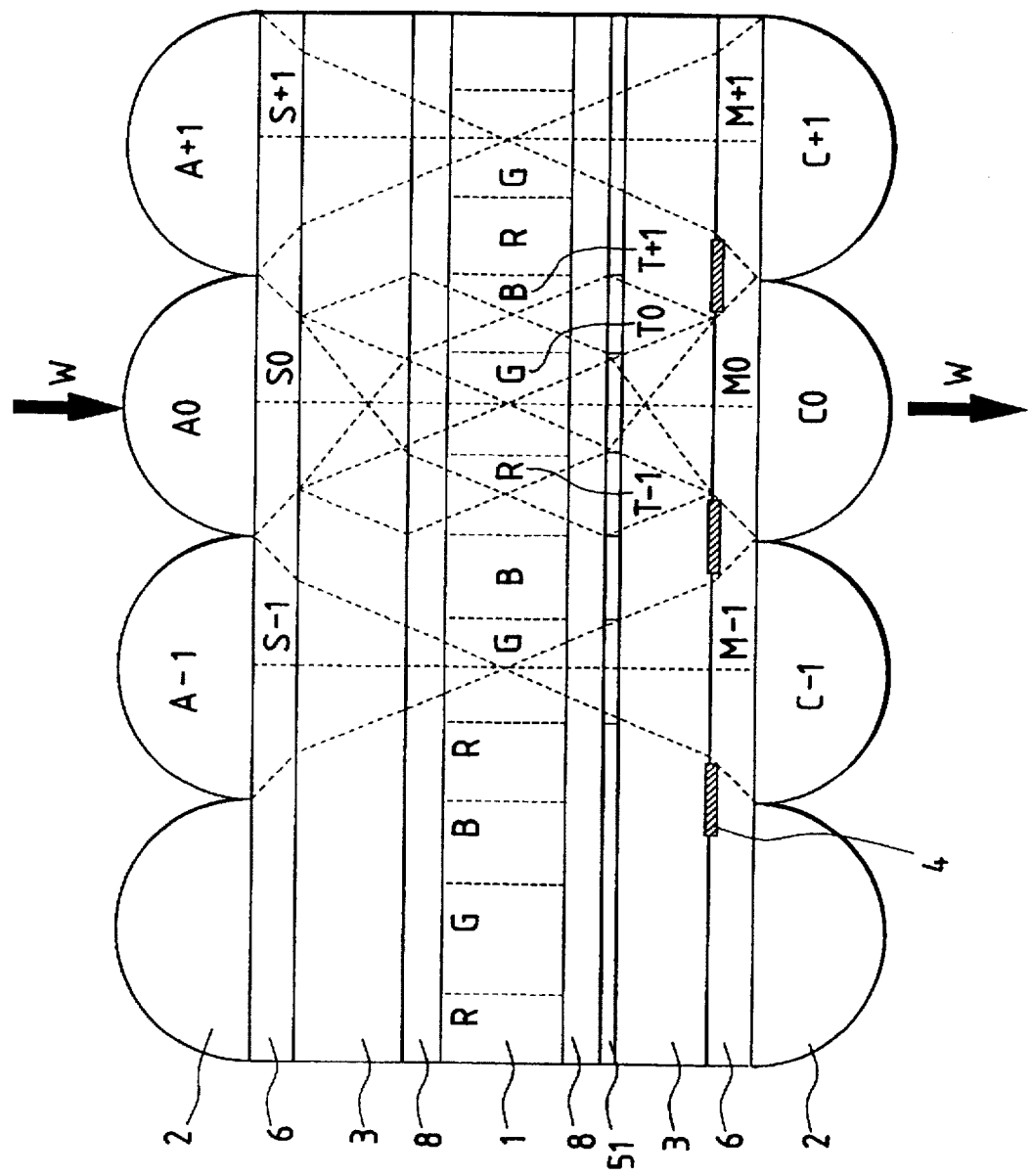
FIG. 35 is a sectional view of the main portion of a transmission-type optical modulator according to the present invention.
Figure 36:
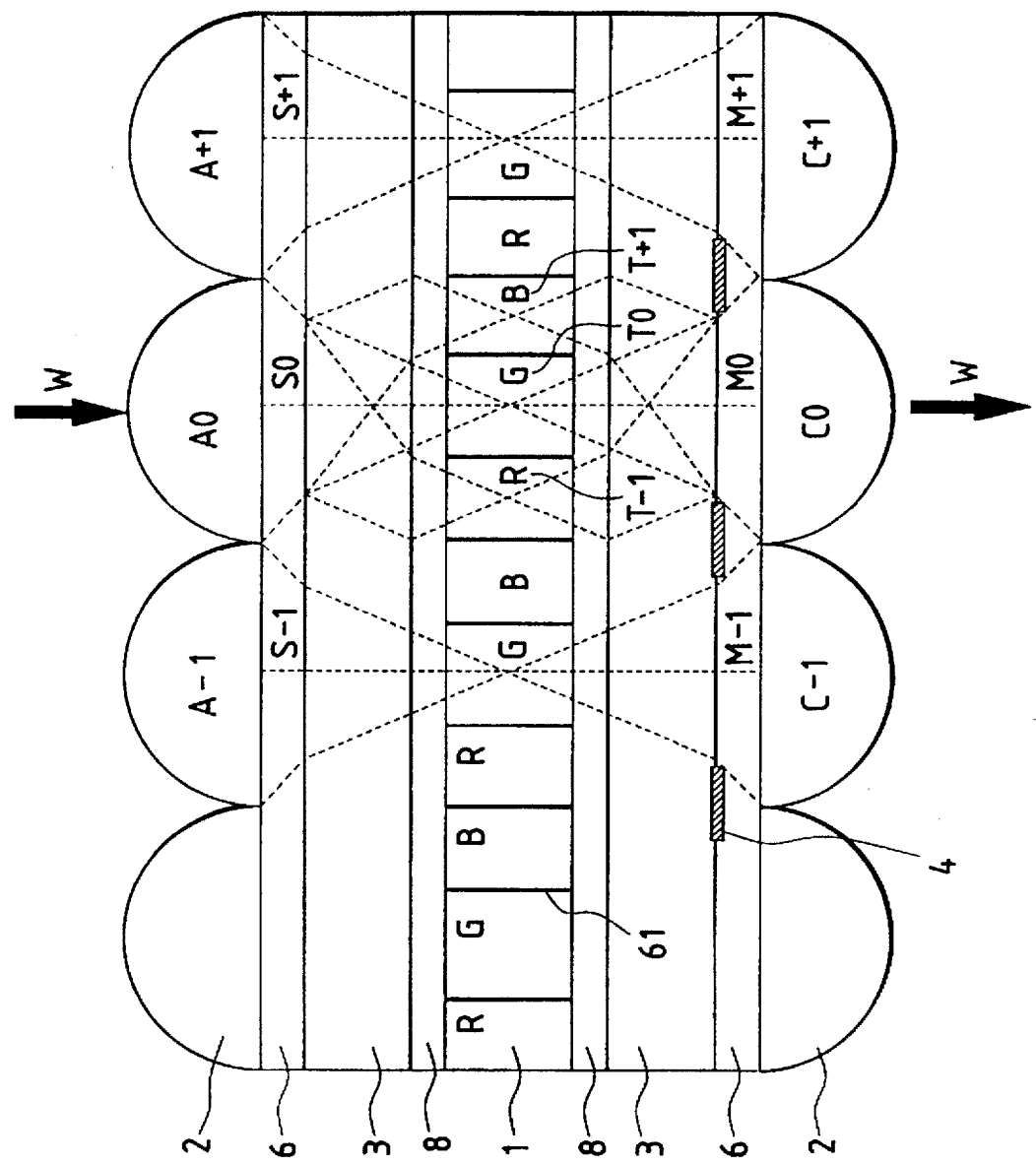
FIG. 36 is a sectional view of the main portion of a transmission-type optical modulator according to the present invention.

By providing the color filters 51 as shown in FIG. 35 or by providing the shading walls 61 between the optical modulation elements as shown in FIG. 36, the image display device with the high-quality image can be provided.

Figure 37:
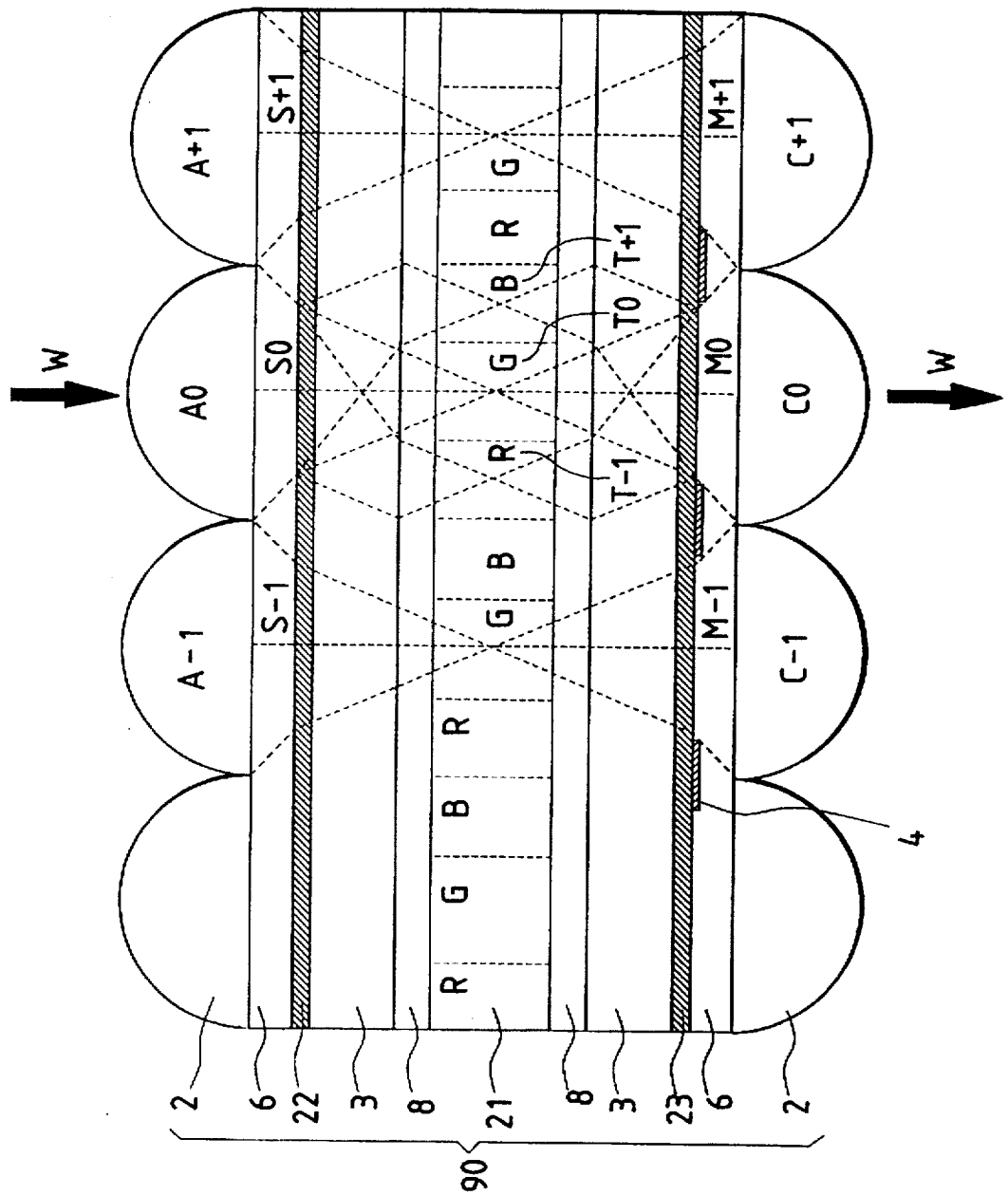
FIG. 37 is a sectional view of the main portion of a transmission-type optical modulator according to the present invention.

FIG. 37 shows the structure using the TN liquid crystal for the optical modulation controlled section. With this arrangement, effects similar to those achieved in the foregoing preferred embodiments can be achieved.

Since the structure of the color image display device is the same as that shown in FIG. 19, explanation thereof is omitted. In this embodiment, although the TN liquid crystal is used for the optical modulation controlled section, another optical modulation controlled section in the form of the guest host liquid crystal or the like may be used. Further, in FIG. 19, if the polarizing separation accuracy of the polarizing beam splitter 19 is not sufficient and thus an improvement in contrast is required, one polarizing plate may be added between the condenser lens 13 and the polarizing beam splitter 19.

Figure 38:
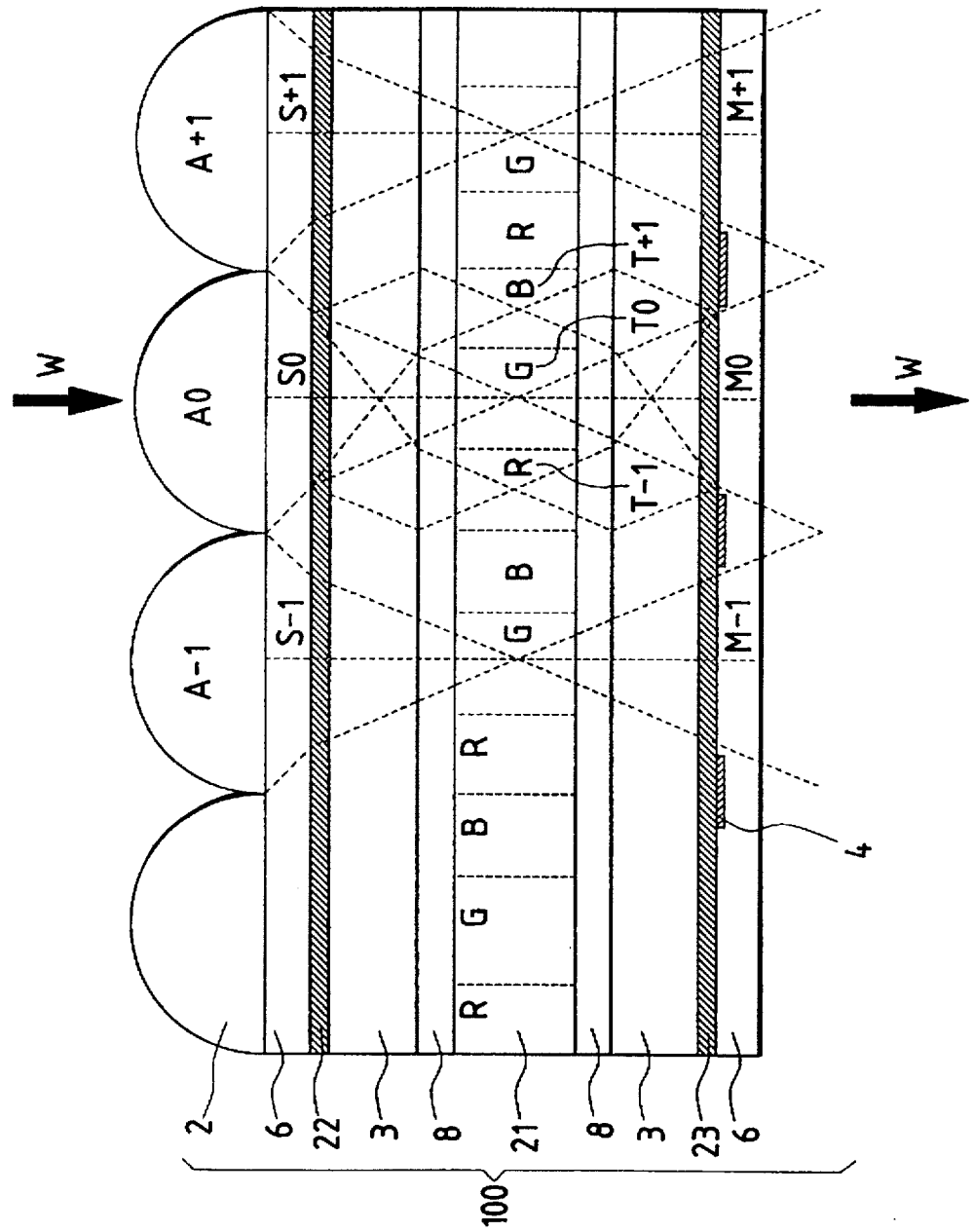
FIG. 38 is a sectional view of the main portion of a transmission-type optical modulator according to the present invention.

In FIG. 38, the condenser elements 2, at the outgoing side, having the collimator element function are removed from the optical modulator shown in FIG. 37. With this arrangement, the outgoing light flux of an optical modulator 100 spreads to a certain degree. In this case, as compared with the optical modulator 90 shown in FIG. 37, when F number of the projection lens is constant, the screen illuminance is somewhat lowered. However, since a thickness L of the glass substrate 3 relative to a size d of one picture element of the optical modulation element 21 is sufficiently large and a spreading angle of the outgoing light flux is significantly small, it is considered not to be a problem so much from a practical point of view. With this arrangement, the number of the optical elements can be reduced so that reduction in adjusting process and manufacturing cost can be achieved.

Figure 39:
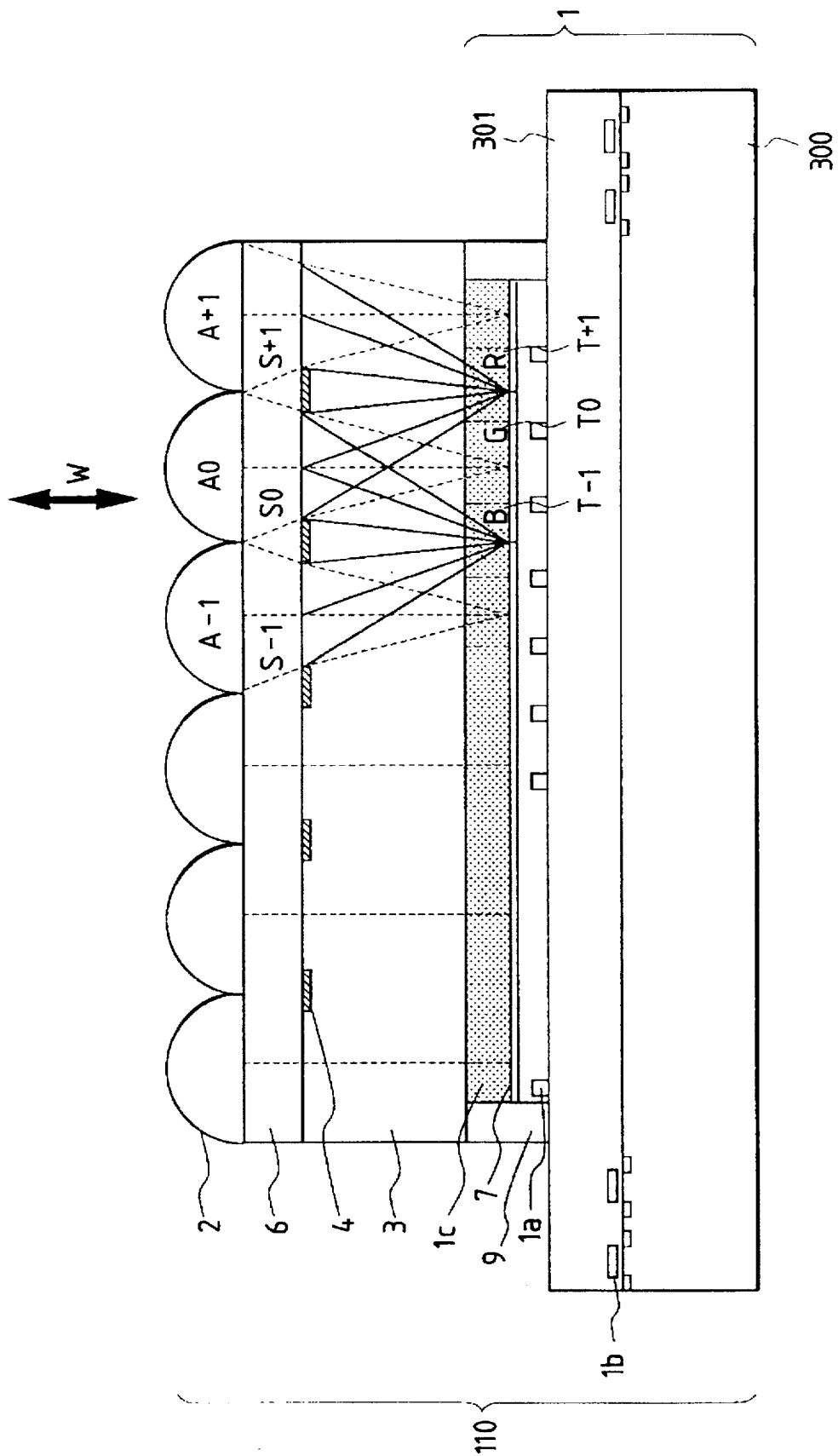
FIG. 39 is a sectional view of the main portion of a reflection-type optical modulator according to the present invention.

FIG. 39 is a diagram showing an optical modulator according to another preferred embodiment of the present invention. Elements assigned the same reference marks as those in FIG. 2 has similar functions so that explanation thereof is omitted.

In this embodiment, the optical modulation element 1 will be described in more detail. In the figure, numeral 9 denotes a sealing member for preventing the liquid crystal, as the optical modulation controlled section, from flowing out. Numeral 1a denotes active elements, such as TFT's or TFD's, each made of polycrystalline Si, and numeral 1b peripheral drive circuits, such as transistors, each made of monocrystalline Si, for driving the active elements. In FIG. 39, only a portion of the active elements 1a is shown. Numeral 1c denotes a liquid-crystal layer. In this embodiment, the PDLC or PNLC is used. Numeral 300 denotes a monocrystalline Si substrate, numeral 301 a field oxide film whose thickness is about 1 μm in this embodiment. The optical modulation element 1 is constituted by the sealing member 9, the active elements 1a, the peripheral drive circuits 1b, the liquid layer 1c, the monocrystalline Si substrate 300, the field oxide film 301 and the like.

The active element 1a may be made of amorphous Si.

In the figure, R (red), G (green) and B (blue) of the liquid-crystal layer 1c represents wavelength bands of the light which is received and reflected by corresponding liquid-crystal picture elements.

The optical paths of the respective color lights are the same as those in the embodiment shown in FIG. 2 so that explanation thereof is omitted.

Figure 40:
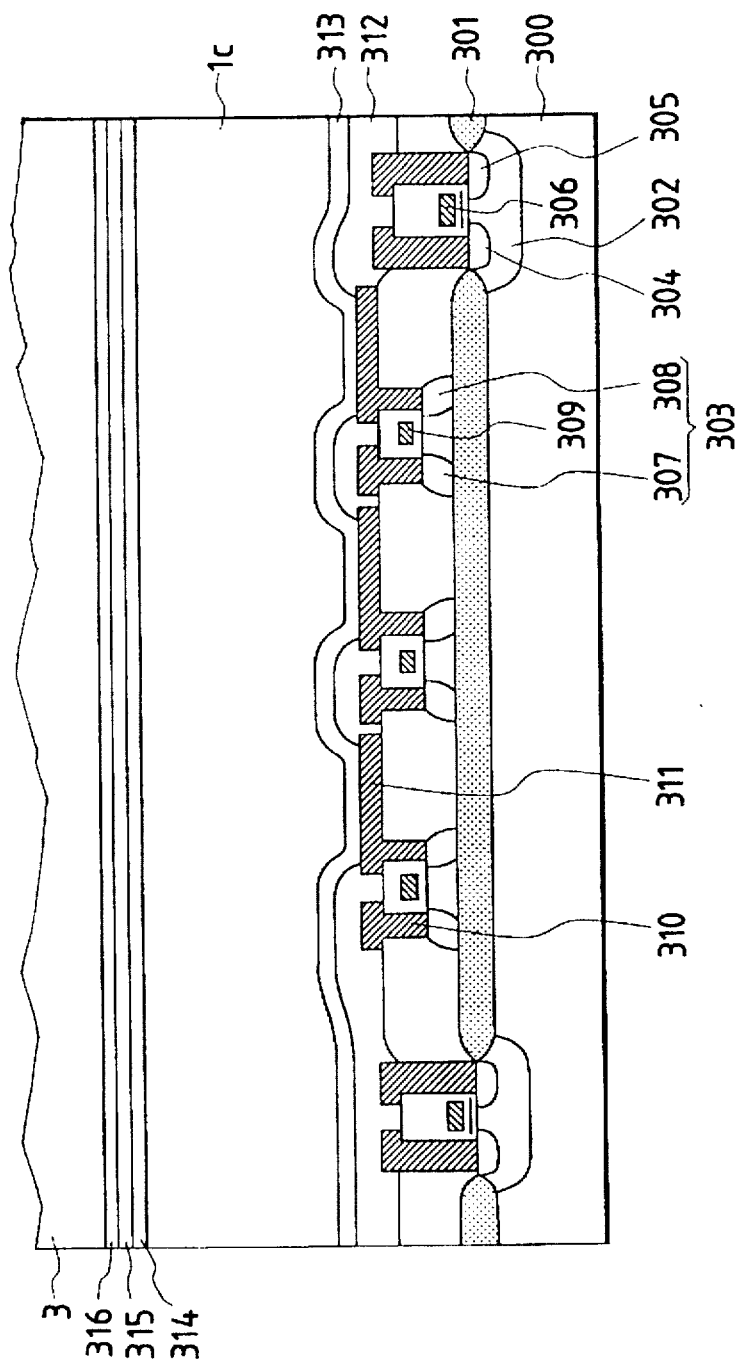
FIG. 40 is an enlarged sectional view of a drive section of the optical modulator shown in FIG. 39.

Now, the active elements 1a and the peripheral drive circuits 1b, which form the feature of this embodiment, will be described in detail using FIG. 40. Although a portion of the elements shown in FIG. 40 is not shown in FIG. 39, FIG. 40 is a detailed enlarged view of FIG. 39 and shows the same modulator as that shown in FIG. 39.

In the figure, numeral 300 denotes a monocrystalline Si substrate, numeral 301 a field oxide film, numeral 302 a well layer of an LCD driving monocrystalline Si transistor, numeral 303 a polycrystalline Si layer forming a picture element portion TFT, numerals 304 and 305 the source and the drain of the driving monocrystalline Si transistor, respectively, numeral 306 the gate of the driving monocrystalline Si transistor, numerals 307 and 308 the source and the drain of the picture element portion TFT, respectively, numeral 309 the gate of the picture element portion TFT, numeral 310 a signal line wiring layer connected to the source of the picture element portion TFT, numeral 311 a reflection electrode of the picture element portion, numeral 312 a passivation film, numerals 313 and 314 orientation films, numeral 1c a liquid crystal layer, numeral 315 a transparent electrode, numeral 3 a transparent substrate, and numeral 316 a reflection prevention film. The reflection electrode 311 of the picture element portion forms the reflection plate 7 shown in FIG. 39. The orientation films 313 and 314 may be omitted when the liquid crystal layer 1c is the PDLC or PNLC.

In this embodiment, voltage is applied across the transparent electrode 315 and the reflection electrode 311. The light flux entering through the transparent substrate 3 is incident upon the liquid crystal layer 1c without reflection by means of the reflection prevention film 316. Similarly, when the light reflected by the reflection electrode 311 and going out through the liquid crystal layer 1c is once again incident upon the reflection prevention film 316, the surface reflection does not occur substantially so that the light energy loss is small. Further, the reflection prevention film 316 suppresses lowering of the contrast by preventing reflection components on the surface of the transparent substrate or the like from being mixed into the reflected light inside the liquid crystal layer.

Instead of the reflection prevention film 316, other means for achieving similar effects can be considered. In this case, the surface of the transparent substrate 3 at a side of the liquid crystal layer is formed into a triangular wave shape, while the transparent electrode 315 is formed into a shape other than the triangular wave shape.

With this arrangement, the reflected light at the interface between the transparent substrate 3 and the transparent electrode 315 is separated so as to suppress the lowering of the contrast.

In this embodiment, the polycrystalline Si TFT is used for the picture element portion and a thickness of the polycrystalline Si film is very small, that is, 200 to 500 Å. Thus, a difference in level does not occur at the picture element portion. Further, since the peripheral circuits are made of monocrystalline Si, the high-speed driving can be achieved so that the highly fine display with several tens to several millions of picture elements can be realized.

A color image display device Using the optical modulator 110 is the same as that shown in FIG. 4, explanation thereof is omitted.

Figure 41:
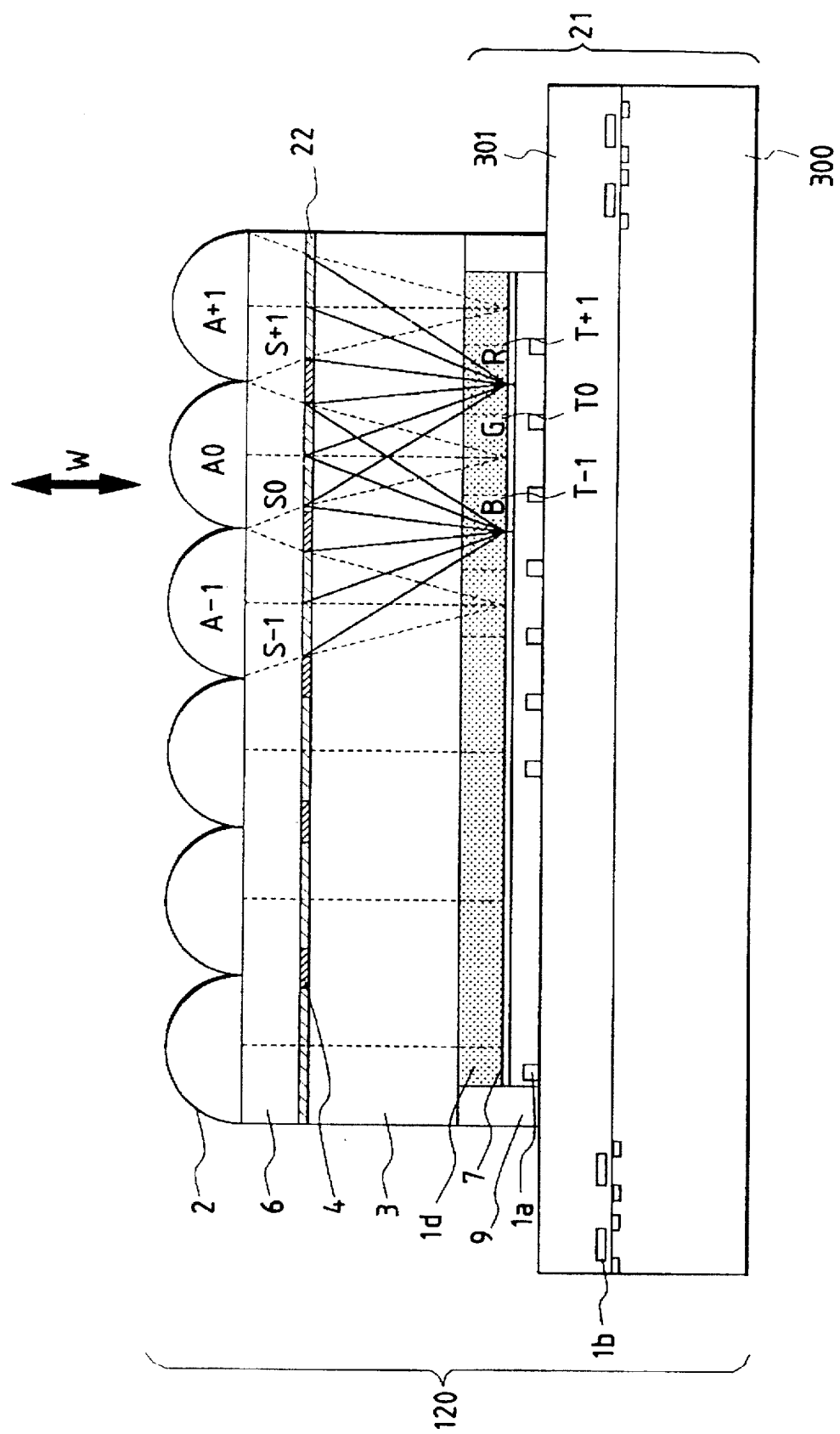
FIG. 41 is a sectional view of the main portion of a reflection-type optical modulator according to the present invention.

FIG. 41 is a diagram showing an optical modulator according to another preferred embodiment of the present invention.

In FIG. 41, elements assigned the same reference marks as those in FIG. 39 works similarly so that explanation thereof is omitted.

An optical modulator 120 shown in FIG. 41 differs from the optical modulator shown in FIG. 39 in that the TN liquid crystal is used for the liquid crystal layer 1d. Following this, the optical modulator 120 has polarizing plates 22.

Since a color image display device using the optical modulator 120 is the same as that shown in FIG. 9, explanation thereof is omitted.

Figure 42:
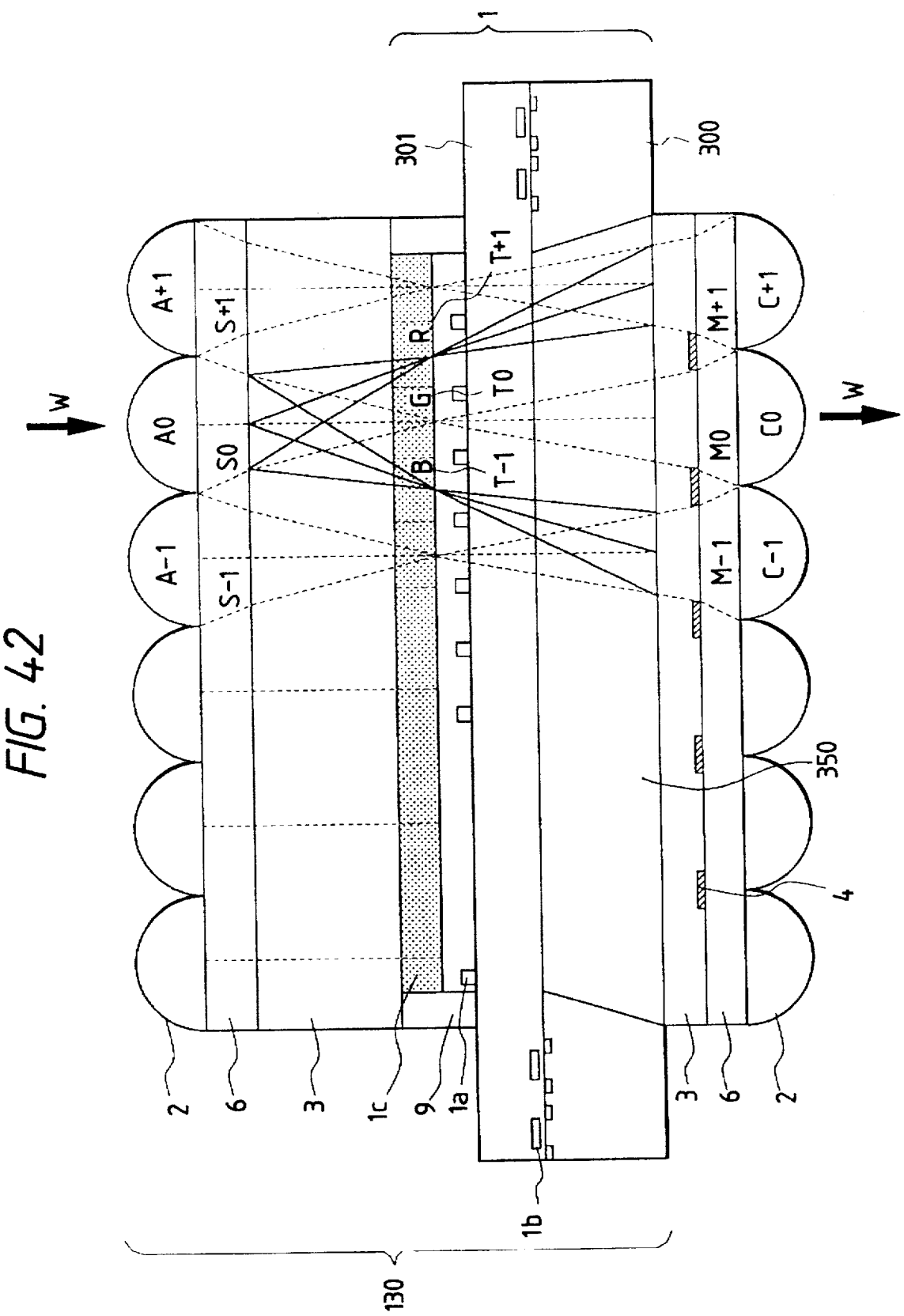
FIG. 42 is a sectional view of the main portion of a transmission-type optical modulator according to the present invention.

FIG. 42 is a diagram showing a transmission-type optical modulator 130. Elements assigned the same reference marks as those of the reflection-type optical modulator 110 have similar functions so that explanation thereof is omitted.

The transmission-type optical modulator 130 differs from the reflection-type optical modulator 110 in that the condenser element groups 2 and the color separating/synthesizing element groups 6 are provided in pairs at the incident and outgoing sides. Accordingly, the condenser element group 2 at the outgoing side works as collimator elements, while the color separating/synthesizing element group 6 at the incident side only performs the color separation and the color separating/synthesizing element group 6 at the outgoing side only performs the color synthesizing. In the figure, the incident side is located at an upper side and the outgoing side is located at a lower side.

Numeral 350 denotes an air layer, that is, a region wherein a monocrystalline Si region just under the oxide field film 301 (transparent) formed at one of the main sides of the monocrystalline Si substrate 300 is removed from the other main side. Reflection prevention films (not shown) are disposed at interfaces between the region 350 and a region where a monocrystalline Si substrate 351 region is removed from the other main side, and between the region 350 and the transparent substrate 3. By providing the reflection prevention films, the surface reflection at each interface is reduced so that the light energy loss of the modulator is reduced. Thus, the bright image display device can be provided. However, the reflection prevention film is not an essential component.

In this embodiment, the elements at the incident side and the outgoing side are not arranged in a symmetrical fashion. Accordingly, when considering one arbitrary color incident upon and going out from one arbitrary picture element, it is necessary to optimally design a thickness of the glass substrate 3 and a thickness of the monocrystalline Si substrate 300 while considering the refraction factors of the respective elements, so as to render equal diameters of the light fluxes on the outgoing surface of the color separating/synthesizing element 6 at the incident side and on the incident surface of the color separating/synthesizing element 6 at the outgoing side. With the foregoing arrangement, the liquid-crystal device, that is, the optical modulator, with high-quality image, less light energy loss and uniform illuminance distribution on the outgoing surface can be provided.

The foregoing is common to all the transmission-type structures of the present invention, and will be omitted hereinbelow in explanation of the preferred embodiments of the transmission type.

Since a color image display device using the optical modulator 130 is the same as that shown in FIG. 16, explanation thereof is omitted.

Figure 43:
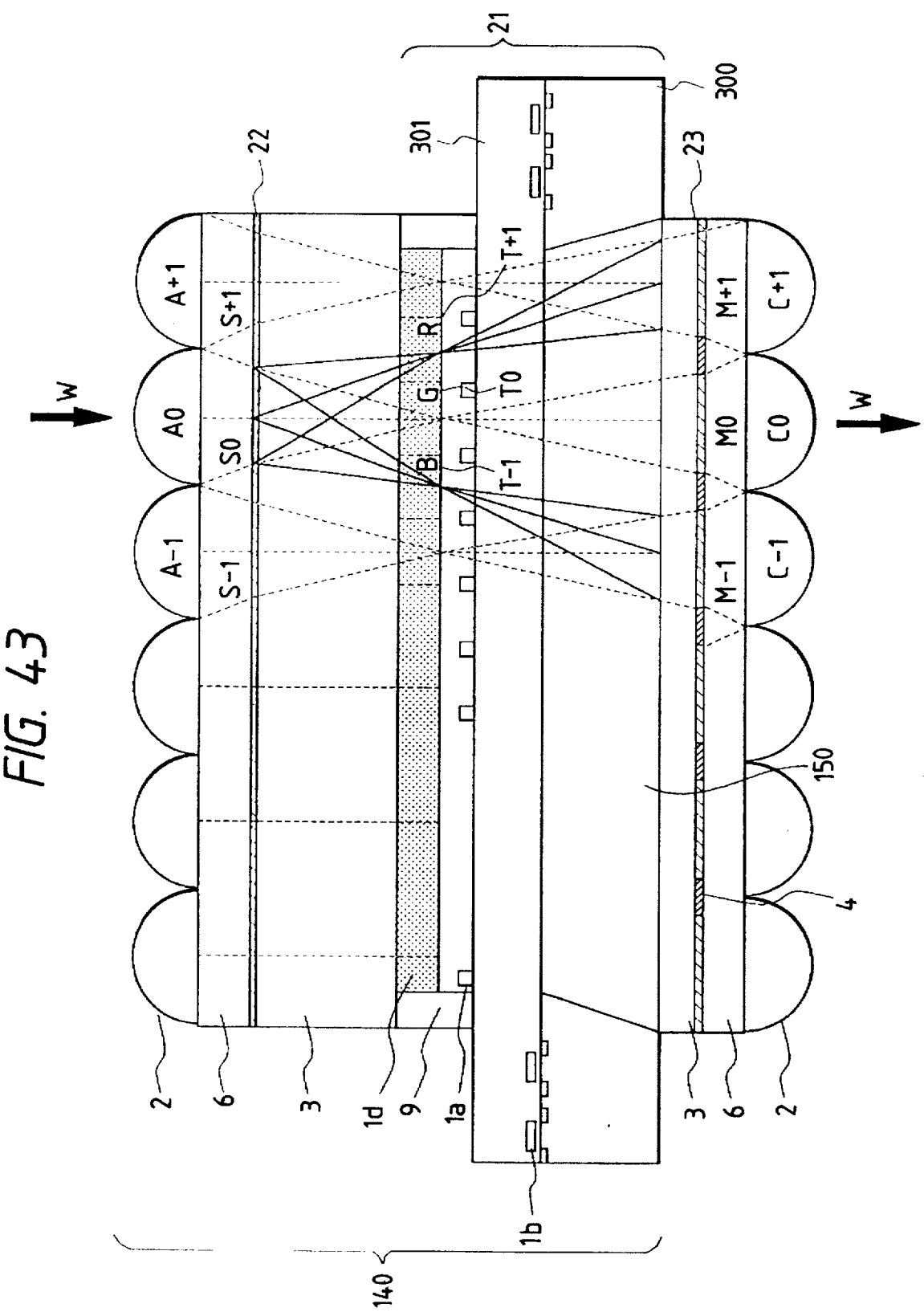
FIG. 43 is a sectional view of the main portion of a transmission-type optical modulator according to the present invention.

For the liquid crystal, not only the PDLC or PNLC but also the TN liquid crystal can be used. FIG. 43 shows that structure. In FIG. 43, numeral 1d denotes a liquid crystal layer in the form of the TN liquid crystal, and numerals 22 and 23 denote polarizing plates whose polarizing axes are orthogonal to each other.

As a color image display device using the optical modulator 140, one shown in FIG. 21 can be used.

Other than the TN liquid crystal, the guest host liquid crystal or others may be used.

Figure 44:
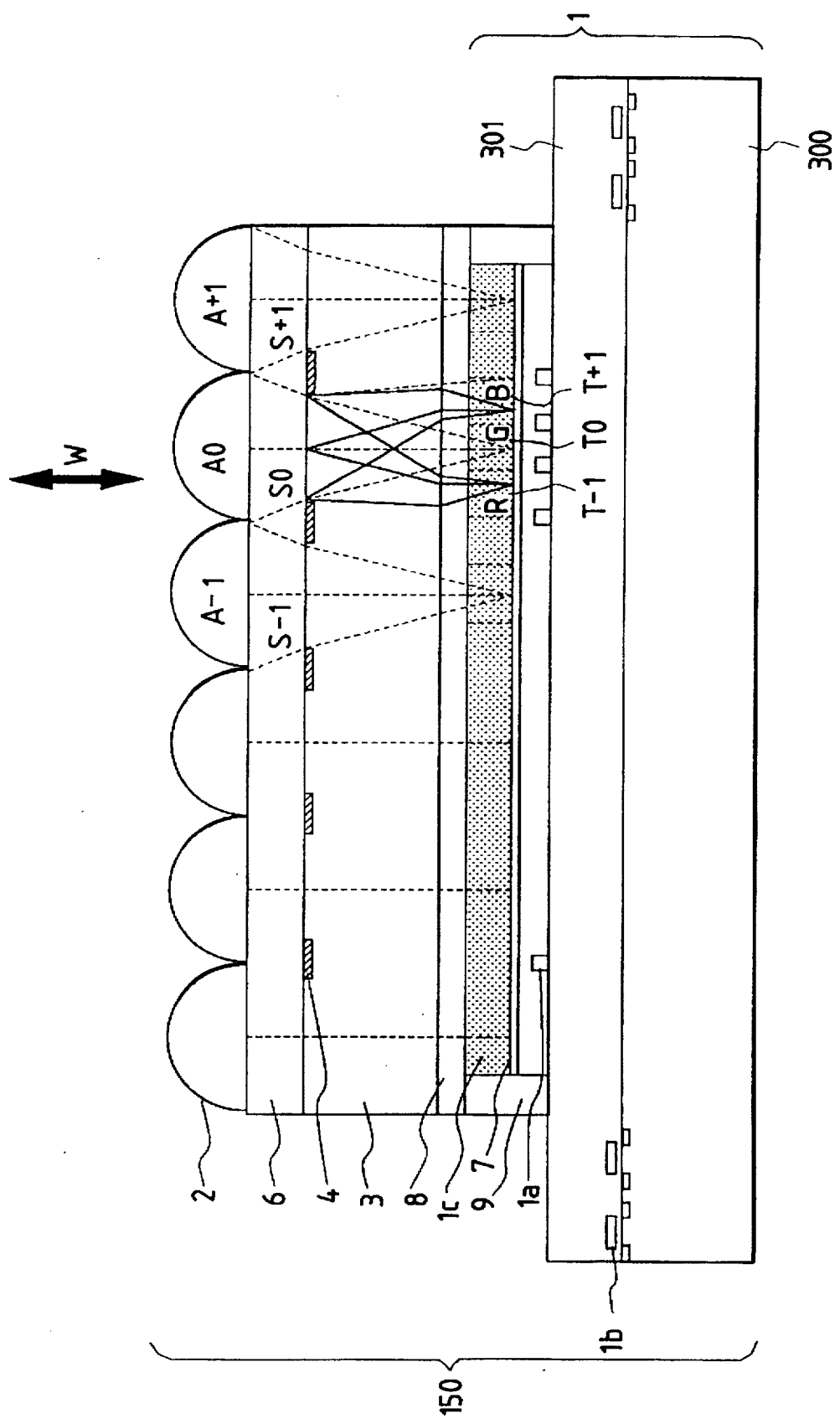
FIG. 44 is a sectional view of the main portion of a reflection-type optical modulator having a flat-plate microlens according to the present invention.

FIG. 44 is a diagram showing an optical modulator according to another preferred embodiment of the present invention.

Since the optical paths of the respective color lights are essentially the same as those shown in FIG. 23, explanation thereof is omitted.

Since a color image display device using the optical modulator 150 is the same as that shown in FIG. 4, explanation thereof is omitted.

In this embodiment, the BOE is used as the color separating/synthesizing element as in the foregoing preferred embodiments. However, another color separating/synthesizing element, such as a hologram, may be used. Further, the condenser element 2 may be in the form of a flat plate microlens.

The TN liquid crystal may be used in the optical modulator shown in FIG. 44. With this arrangement, effects similar to those achieved in the foregoing preferred embodiments can be achieved.

Other than the TN liquid crystal, the guest host liquid crystal or others may be used.

Figure 45:
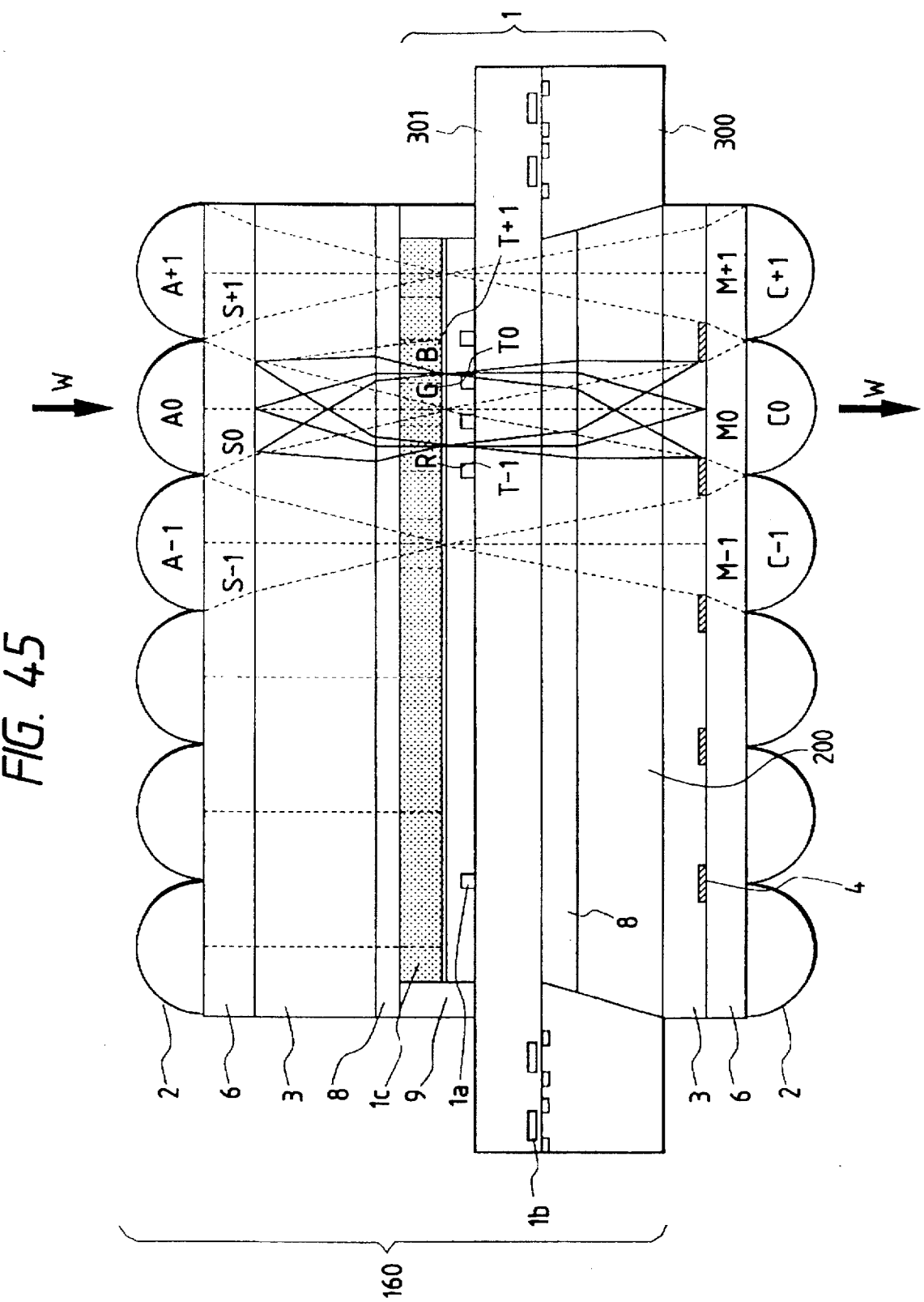
FIG. 45 is a sectional view of the main portion of a transmission-type optical modulator having a flat-plate microlens according to the present invention.

FIG. 45 is a diagram showing a transmission-type optical modulator having the flat-plate microlens 8.

Since a color image display device is the same as that shown in FIG. 16, explanation thereof is omitted.

In this embodiment, other than the TN liquid crystal, the guest host liquid crystal or others may be used for the liquid crystal layer. With this arrangement, effects similar to those achieved in the foregoing preferred embodiments can be achieved.

As described above, according to the present invention, the optical modulator with high light utilization efficiency can be achieved. Further, if the optical modulator of the present invention is used in the color image display device, the device with high-quality image can be realized.

What is claimed is:

1. An optical modulator comprising:
   a first diffraction grating for separating a light flux of a wide wavelength band into light fluxes by each of given wavelength bands;
   an optical modulation element for modulating said separated light fluxes by each of corresponding picture elements, respectively, and outputting them; and
   a second diffraction grating for synthesizing said modulated light fluxes outputted from said optical modulation element,
   wherein said first diffraction grating, said optical modulation element and said second diffraction grating are integrally structured.

2. The optical modulator according to claim 1, wherein said first and second diffraction gratings comprise binary optical elements, respectively.

3. The optical modulator according to claim 1, further comprising means for causing a main beam of each of said light fluxes separated by said first diffraction grating to be incident perpendicularly upon corresponding one of said picture elements.

4. The optical modulator according to claim 1, further comprising condenser means for converging the light flux of said wide wavelength band and causing the converged light flux to be incident upon each of said picture elements.

5. The optical modulator according to claim 1, further comprising condenser means for converging the light fluxes separated by said first diffraction grating and causing the converged light fluxes to be incident upon said picture elements, respectively.

6. The optical modulator according to claim 1, wherein said optical modulation element comprises a liquid-crystal element.

7. The optical modulator according to claim 1, wherein said optical modulator is one of a transmission-type optical modulator and a reflection-type optical modulator.

8. The optical modulator according to claim 7, wherein said optical modulator is the reflection-type optical modulator, and wherein said first and second diffraction gratings are the same.

9. An optical modulator comprising:
   a diffraction grating for separating a light flux of a wide wavelength band into light fluxes by each of given wavelength bands;
   an optical modulation element for modulating said separated light fluxes through corresponding picture elements, respectively, and outputting them; and
   means for causing a principal beam of each of said light fluxes separated by said diffraction grating to be incident perpendicularly upon corresponding one of said picture elements.

10. The optical modulator according to claim 9, wherein said diffraction grating comprises a binary optical element.

11. The optical modulator according to claim 9, further comprising condenser means for converging the light flux of said wide wavelength band and causing the converged light flux to be incident upon each of said picture elements.

12. The optical modulator according to claim 9, further comprising condenser means for converging the light fluxes separated by said diffraction grating and causing the converged light fluxes to be incident upon said picture elements, respectively.

13. The optical modulator according to claim 9, further comprising optical synthesizing means for synthesizing said modulated light fluxes outputted from said optical modulation element.

14. The optical modulator according to claim 13, wherein said optical synthesizing means comprises a binary optical element.

15. The optical modulator according to claim 9, wherein said optical modulation element comprises a liquid-crystal element.

16. The optical modulator according to claim 9, wherein said optical modulator includes a reflection-type optical modulator.

17. An optical modulator comprising:
a binary optical element for separating a light flux of a wide wavelength band into light fluxes by each of given wavelength bands; and
an optical modulation element for modulating said separated light fluxes through corresponding picture elements, respectively, and outputting them,
wherein the separated light beams by each of said given wavelength bands the binary optical element are incident on different picture elements of said optical modulation element.

18. The optical modulator according to claim 17, further comprising means for causing a main beam of each of said light fluxes separated by said binary optical element to be incident perpendicularly upon corresponding one of said picture elements.

19. The optical modulator according to claim 17, further comprising condenser means for converging the light flux of said wide wavelength band and causing the converged light flux to be incident upon each of said picture elements.

20. The optical modulator according to claim 17, further comprising condenser means for converging the light fluxes separated by said binary optical element and causing the converged light fluxes to be incident upon said picture elements, respectively.

21. The optical modulator according to claim 17, further comprising optical synthesizing means for synthesizing said modulated light fluxes outputted from said optical modulation element.

22. The optical modulator according to claim 21, wherein said optical synthesizing means includes a binary optical element.

23. The optical modulator according to claim 17, wherein said optical modulation element includes a liquid-crystal element.

24. An optical modulator comprising:
a binary optical element for separating a light flux of a wide wavelength band into light fluxes of given wavelength bands;
an optical modulation element for modulating said separated light fluxes by each of corresponding picture elements, respectively, and outputting them; and
reflection means for reflecting the light fluxes transmitted through said optical modulation element,
wherein said binary optical element synthesizes the light fluxes modulated by said optical modulation element.

25. The optical modulator according to claim 24, further comprising means for causing a principal beam of each of said light fluxes separated by said binary optical element to be incident perpendicularly upon corresponding one of said picture elements.

26. The optical modulator according to claim further comprising condenser means for converging the light flux of said wide wavelength band and causing the converged light flux to be incident upon each of said picture elements.

27. The optical modulator according to claim 24, further comprising condenser means for converging the light fluxes separated by said binary optical element and causing the converged light fluxes to be incident upon said picture elements, respectively.

28. The optical modulator according to claim 24, wherein said optical modulation element comprises a liquid-crystal element.

29. A color image display device comprising: said optical modulator according to claim 1.

30. A color image display device comprising: said optical modulator according to claim 2.

31. A color image display device comprising: said optical modulator according to claim 3.

32. A color image display device comprising: said optical modulator according to claim 4.

33. A color image display device comprising: said optical modulator according to claim 5.

34. A color image display device comprising: said optical modulator according to claim 6.

35. A Color image display device comprising: said optical modulator according to claim 7.

36. A color image display device comprising: said optical modulator according to claim 8.

37. A color image display device comprising: said optical modulator according to claim 9.

38. A color image display device comprising: said optical modulator according to claim 10.

39. A color image display device comprising: said optical modulator according to claim 11.

40. A color image display device comprising: said optical modulator according to claim 12.

41. A color image display device comprising: said optical modulator according to claim 13.

42. A color image display device comprising: said optical modulator according to claim 14.

43. A color image display device comprising: said optical modulator according to claim 15.

44. A color image display device comprising: said optical modulator according to claim 16.

45. A color image display device comprising: said optical modulator according to claim 17.

46. A color image display device comprising: said optical modulator according to claim 18.

47. A color image display device comprising: said optical modulator according to claim 19.

48. A color image display device comprising: said optical modulator according to claim 20.

49. A color image display device comprising: said optical modulator according to claim 21.

50. A color image display device comprising: said optical modulator according to claim 22.

51. A color image display device comprising: said optical modulator according to claim 23.

52. A color image display device comprising: said optical modulator according to claim 24.

53. A color image display device comprising: said optical modulator according to claim 25.

54. A color image display device comprising: said optical modulator according to claim 26.

55. A color image display device comprising: said optical modulator according to claim 27.

56. A color image display device comprising: said optical modulator according to claim 28.

* * * * *

UNITED STATES PATENT AND TRADEMARK OFFICE
CERTIFICATE OF CORRECTION

PATENT NO. : 5,737,113
DATED : April 7, 1998
INVENTOR(S) : Kuramochi et al.

It is certified that error appears in the above-identified patent and that said Letters Patent is hereby corrected as shown below:

Title page, item [54] and Col. 1, line 1.

IN THE TITLE:

"MODULATORS" should read --MODULATOR--.

COLUMN 10:

Line 41, "can not" should read --cannot--.

COLUMN 14:

Line 12, "can not" should read --cannot--.

COLUMN 15:

Line 14, "has" should read --have--.

UNITED STATES PATENT AND TRADEMARK OFFICE
CERTIFICATE OF CORRECTION

PATENT NO. : 5,737,113
DATED : April 7, 1998
INVENTOR(S) : Kuramochi et al.

It is certified that error appears in the above-identified patent and that said Letters Patent is hereby corrected as shown below:

Column 20:

Line 8, "claim" should read --claim 24,--.

Signed and Sealed this

Twenty-second Day of September, 1998

Attest:

BRUCE LEHMAN

Attesting Officer      Commissioner of Patents and Trademarks